(12) United States Patent
Marques et al.

(10) Patent No.: US 10,344,666 B2
(45) Date of Patent: Jul. 9, 2019

(54) TURBINE WASTEGATE

(71) Applicant: Garrett Transportation I Inc., Torrance, CA (US)

(72) Inventors: Manuel Marques, Richardmenil (FR); Stephane Dieudonne, Thaon-les-Vosges (FR); Frederic Bachard, Azelot (FR)

(73) Assignee: Garrett Transportation I Inc., Torrance, CA (US)

( * ) Notice: Subject to any disclaimer, the term of this patent is extended or adjusted under 35 U.S.C. 154(b) by 761 days.

(21) Appl. No.: 14/474,249

(22) Filed: Sep. 1, 2014

(65) Prior Publication Data

US 2016/0061208 A1 Mar. 3, 2016

(51) Int. Cl.
| | | |
|---|---|---|
| *F04D 27/00* | (2006.01) | |
| *F02B 37/18* | (2006.01) | |
| *F04D 29/26* | (2006.01) | |
| *F04D 29/60* | (2006.01) | |

(52) U.S. Cl.
CPC .......... *F02B 37/183* (2013.01); *Y02T 10/144* (2013.01)

(58) Field of Classification Search
CPC ...... F02B 37/18; F02B 37/183; F02B 37/186; F01D 17/08; F01D 17/10; F01D 17/105; F04D 27/009; F04D 27/02; F04D 27/0207; F04D 27/0215; F04D 27/023; F05D 2260/605; F05D 2260/606
See application file for complete search history.

(56) References Cited

U.S. PATENT DOCUMENTS

| | | | | |
|---|---|---|---|---|
| 4,530,640 | A | * 7/1985 | MacInnes | ............... F01D 9/026 415/144 |
| 2012/0216534 | A1 | * 8/2012 | Werstat | ................. F01D 17/105 60/611 |
| 2012/0292547 | A1 | * 11/2012 | Kierat | ..................... F02B 37/18 251/231 |
| 2012/0312010 | A1 | * 12/2012 | Yasoshima | ............ F01D 17/105 60/602 |
| 2013/0089411 | A1 | * 4/2013 | Ward | .................... F01D 17/165 415/151 |

(Continued)

FOREIGN PATENT DOCUMENTS

| | | |
|---|---|---|
| DE | 10 2009 029880 A1 | 12/2010 |
| DE | 10 2011 002918 A1 | 12/2011 |

(Continued)

OTHER PUBLICATIONS

EP Application No. 15181646.9-1606 / 2998540, EP Search Report and Examination dated May 10, 2016 (10 pages).

(Continued)

*Primary Examiner* — Justin D Seabe
*Assistant Examiner* — Alexander A White
(74) *Attorney, Agent, or Firm* — Brian J. Pangrie

(57) ABSTRACT

A method can include applying a force to a control arm operatively coupled to a shaft; transmitting at least a portion of the force from the shaft, via an arm, to a plug positioned with respect to a wastegate seat of a turbine housing; maintaining an isostatic condition for relative positions of the shaft, the arm and the plug wherein contact exists between the plug and the wastegate seat; and in the isostatic condition, fixing the relative positions of the shaft, the arm and the plug via welding.

19 Claims, 14 Drawing Sheets

(56) References Cited

U.S. PATENT DOCUMENTS

| | | | | |
|---|---|---|---|---|
| 2013/0149114 A1* | 6/2013 | Kohler | ............... | F01D 17/105 |
| | | | | 415/145 |
| 2014/0174077 A1* | 6/2014 | Palaniyappan | ....... | F16K 1/2014 |
| | | | | 60/602 |
| 2015/0044033 A1* | 2/2015 | Murayama | ............ | F02B 37/183 |
| | | | | 415/145 |
| 2017/0058761 A1 | 3/2017 | Stilgenbauer et al. | | |

FOREIGN PATENT DOCUMENTS

| | | |
|---|---|---|
| DE | 10 2011 086507 A1 | 5/2013 |
| DE | 20 2014 003 918.6 | 5/2014 |
| DE | 202014003918.6 | 5/2014 |
| DE | 202014003918 U1 | 6/2014 |
| DE | 20 2014 003 918 U1 | 7/2014 |
| DE | 20 2014 007 538.7 | 9/2014 |
| DE | 202014007538.7 | 9/2014 |
| DE | 202014007538 U1 | 10/2014 |
| DE | 20 2014 007 538 U1 | 11/2014 |
| EP | 2 508 730 A2 | 10/2012 |
| EP | 2 708 717 A1 | 3/2014 |
| JP | 199443227 U | 6/1994 |
| WO | 2014/011468 A1 | 1/2014 |
| WO | 2014002809 A1 | 1/2014 |
| WO | 2015/171541 A1 | 11/2015 |

OTHER PUBLICATIONS

EPO Examination Report, EP Application No. 15 181 646..9-1616, dated Feb. 15, 2017 (4 pages).

EPO Examination Report as to Third Party Observation, EP Application No. 15 181 646.9-1616, dated Aug. 30, 2017 (17 pages).

EPO Examination Report, EP Application No. 15 181 646.9-1616, dated Aug. 28, 2017 (3 pages).

EPO Examination Report, EP Application No. 15 181 646.9-1616, dated Jul. 10, 2018 (4 pages).

Third Party Observation, EP Application No. 15 181 646.9-1616, dated Apr. 19, 2018 (3 pages).

* cited by examiner

TURBINE WASTEGATE

TECHNICAL FIELD

Subject matter disclosed herein relates generally to turbomachinery for internal combustion engines and, in particular, to turbine wastegates.

BACKGROUND

A turbine wastegate is typically a valve that can be controlled to selectively allow at least some exhaust to bypass a turbine. Where an exhaust turbine drives a compressor for boosting inlet pressure to an internal combustion engine (e.g., as in a turbocharger), a wastegate provides a means to control the boost pressure.

A so-called internal wastegate is integrated at least partially into a turbine housing. An internal wastegate typically includes a flapper valve (e.g., a plug), a crank arm, a shaft or rod, and an actuator. A plug of a wastegate often includes a flat disk shaped surface that seats against a flat seat (e.g., a valve seat or wastegate seat) disposed about an exhaust bypass opening, though various plugs may include a protruding portion that extends into an exhaust bypass opening (e.g., past a plane of a wastegate seat).

In a closed position, a wastegate plug should be seated against a wastegate seat (e.g., seating surface) with sufficient force to effectively seal an exhaust bypass opening (e.g., to prevent leaking of exhaust from a high pressure exhaust supply to a lower pressure region). Often, an internal wastegate is configured to transmit force from an arm to a plug (e.g., as two separate, yet connected components). During engine operation, load requirements for a wastegate vary with pressure differential. High load requirements can generate high mechanical stresses in a wastegate's kinematics components, a fact which has led in some instances to significantly oversized component design to meet reliability levels (e.g., as demanded by engine manufacturers). Reliability of wastegate components for gasoline engine applications is particularly important where operational temperatures and exhaust pulsation levels can be quite high.

Various examples of wastegates, wastegate components and wastegate related processes are described herein.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
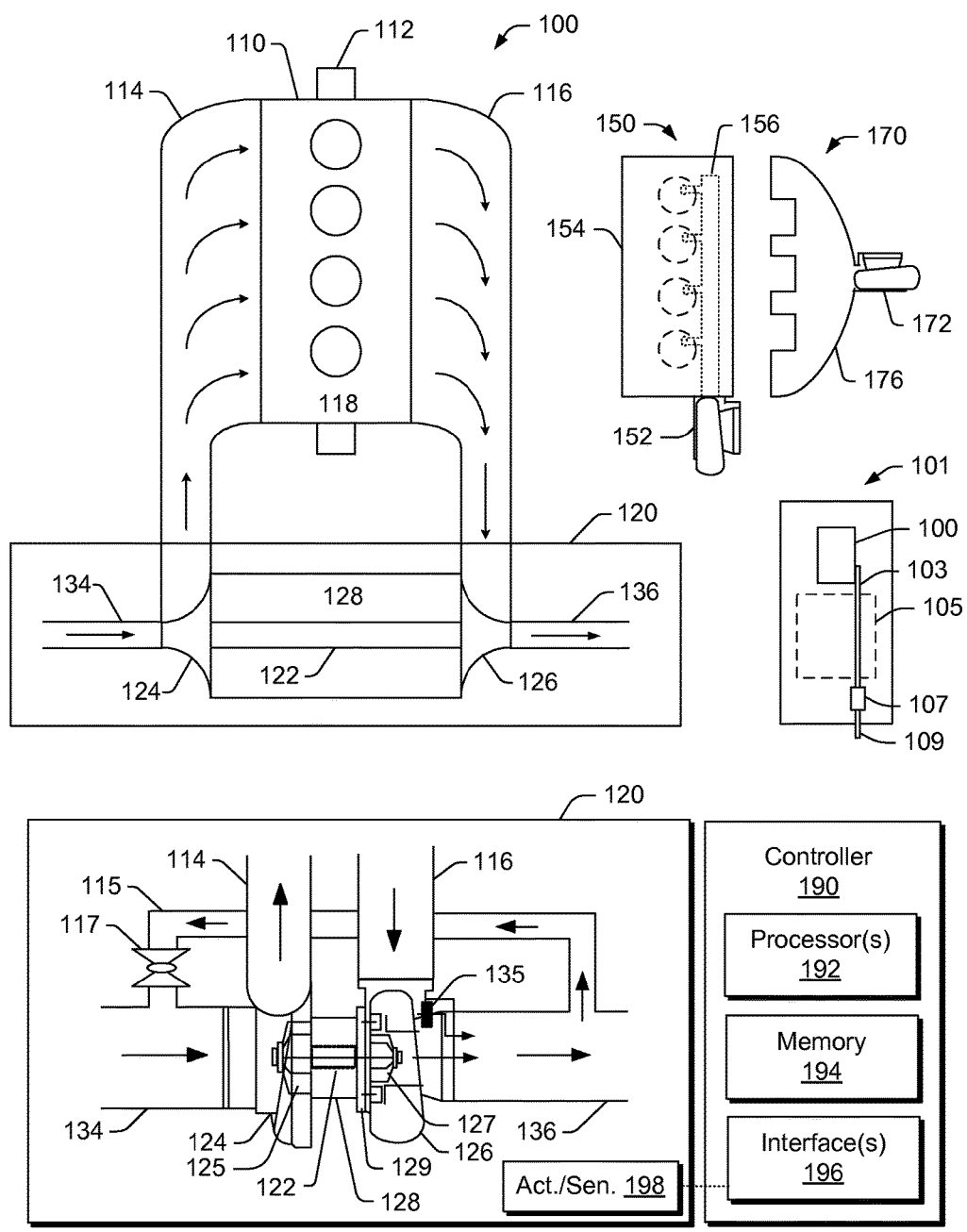
FIG. 1 is a diagram of a turbocharger and an internal combustion engine along with a controller and an example of a vehicle.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
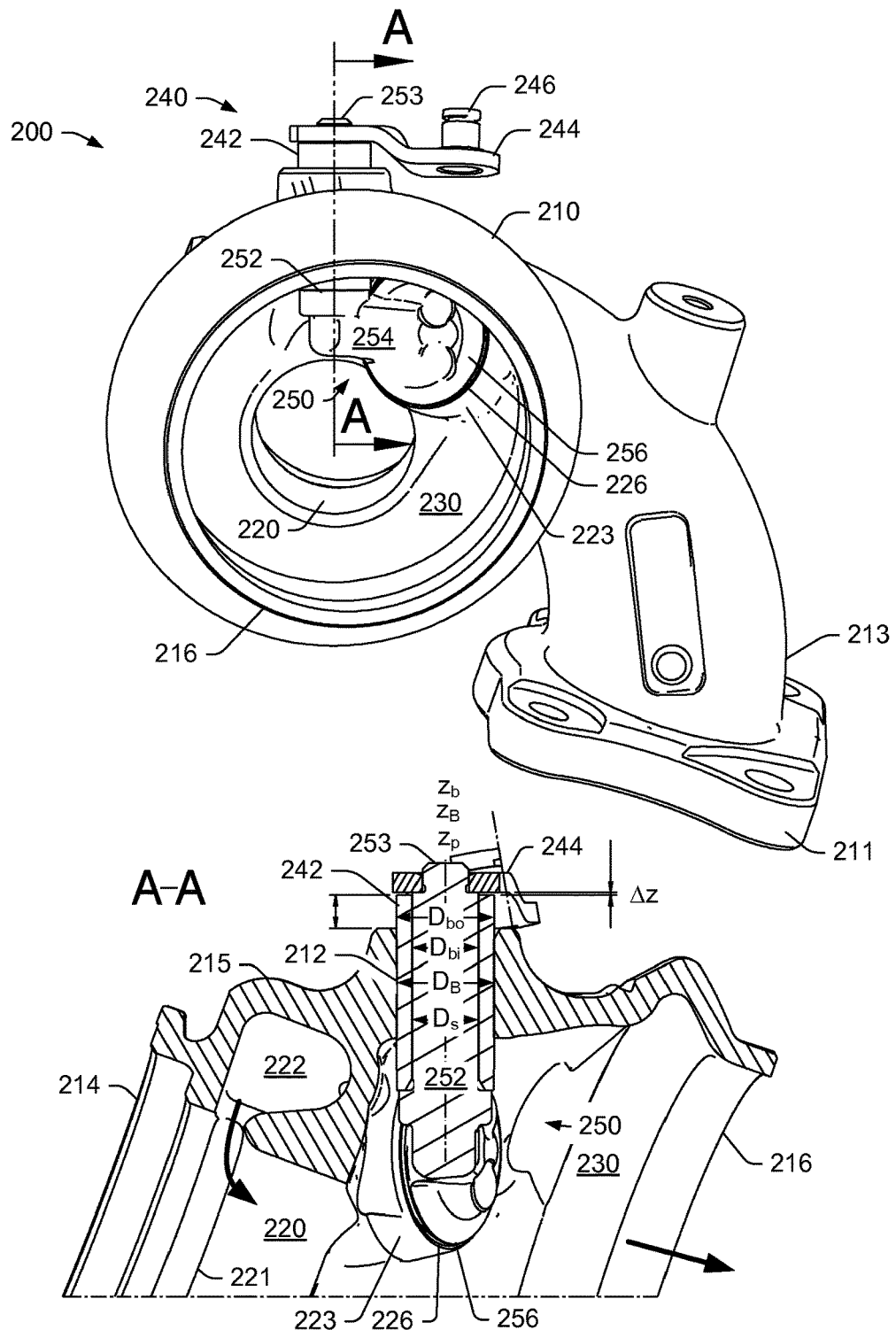
FIG. 2 is a series of view of an example of an assembly that includes a wastegate.

FIG. 2 shows an example of an assembly 200 that includes a turbine housing 210 that includes a flange 211, a bore 212, an inlet conduit 213, a turbine wheel opening 214, a spiral wall 215, an exhaust outlet opening 216, a shroud wall 220, a nozzle 221, a volute 222 formed in part by the spiral wall 215, a wastegate wall 223 that extends to a wastegate seat 226, and an exhaust chamber 230. In the example of FIG. 2, the turbine housing 210 may be a single piece or multi-piece housing. As an example, the turbine housing 210 may be a cast component (e.g., formed via a sand casting or another casting process). The turbine housing 210 includes various walls, which can define features such as the bore 212, the turbine wheel opening 214, the exhaust outlet opening 216, the chamber 230, etc. In particular, the wastegate wall 223 defines a wastegate passage in fluid communication with the inlet conduit 213 where a wastegate control linkage 240 and a wastegate arm and plug 250 are configured for opening and closing the wastegate passage (e.g., for wastegating exhaust).

In the example of FIG. 2, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths. For example, the shaft 252 includes a diameter $D_s$, the bore 212 includes a diameter $D_B$ while the bushing 242 includes an inner diameter $D_{bi}$ and an outer diameter $D_{bo}$. In the example of FIG. 2, when the various components are assembled, the diameters may be as follows: $D_B > D_{bo} > D_{bi} > D_s$. As to lengths, a length of the shaft 252 exceeds a length of the bushing 242, which exceeds a length of the bore 212. Such lengths may be defined with respect to a shaft axis $z_s$, a bushing axis $z_b$ and a bore axis $z_B$. As shown, the bushing 242 is disposed axially between a shoulder of the shaft 252 and the control arm 244 of the control linkage 240.

In the example of FIG. 2, a gap $\Delta z$ is shown between a surface of the bushing 242 and a surface of the control arm 244, which allows for axial movement of the shaft 252, for example, to facilitate self-centering of the plug 256 with respect to the wastegate seat 226.

As an example, the assembly 200 may be fitted to an exhaust conduit or other component of an internal combustion engine (see, e.g., examples of FIG. 1) via the flange 211 such that exhaust is received via the inlet conduit 213, directed to the volute 222. From the volute 222, exhaust is directed via the nozzle 221 to a turbine wheel disposed in the turbine housing 210 via the opening 214 to flow and expand in a turbine wheel space defined in part by the shroud wall 220. Exhaust can then exit the turbine wheel space by flowing to the chamber 230 and then out of the turbine housing 210 via the exhaust outlet opening 216.

As to wastegating, upon actuation of the control linkage 240 (e.g., by an actuator coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through the nozzle 221 to the turbine wheel space. The wastegated portion of the exhaust may then exit the turbine housing 210 via the exhaust outlet opening 216 (e.g., and pass to an exhaust system of a vehicle, be recirculated in part, etc.).

As an example, the control linkage 240 may exert a force that acts to force the plug 256 in a direction toward the wastegate seat 226. For example, an actuator may include a biasing mechanism (e.g., a spring, etc.) that exerts force, which may be controllably overcome, at least in part, for rotating the plug 256 away from the wastegate seat 226 (e.g., for wastegating). As an example, an actuator may be mounted to a turbocharger (e.g., mounted to a compressor assembly, etc.). As an example, an actuator may be a linear actuator, for example, that includes a rod that moves along an axis. Depending on orientation of a plug, a shaft, a control linkage and such a rod, to maintain the plug in a closed position, the rod may exert a downward force (e.g., away from the control linkage as in the example of FIG. 2) or the rod may exert an upward force (e.g., toward the control linkage). For example, where the control arm 244 (e.g., and the peg 246) of the control linkage 240 are oriented on the same "side" as the plug 256 with respect to the shaft 252, a downward force applied to the control arm 244 (e.g., via the peg 246) may act to maintain the plug 256 in a closed position with respect to the wastegate seat 226; whereas, where, for example, an approximately 180 degree span exists between a plug and a control arm, an upward force applied to the control arm may act to maintain the plug in a closed position with respect to a wastegate seat.

As an example, a rod of an actuator may be biased to exert a force on a control linkage that causes the control linkage to exert a force on a plug (see, e.g., the plug 256) such that the plug seats against a wastegate seat (see, e.g., the wastegate seat 226). In such an example, the actuator may at least in part overcome the force that biases the rod such that a shaft rotates the plug away from the wastegate seat. For example, in FIG. 2, to initiate wastegating, the entire plug 256 rotates about an axis of the shaft 252 and moves away from the wastegate seat 226 (e.g., without any portion of the plug 256 moving into a wastegate opening defined by the wastegate seat 226). As an example, the moving away of the plug 256 may be facilitated by exhaust pressure. For example, in a closed position, the plug 256 experiences a pressure differential where pressure is higher below the plug 256 and less above the plug 256. In such an example, the pressure below the plug 256 acts in a direction that is countered by the closing force applied to the plug 256 via the control linkage 240 (e.g., the pressure differential acts to bias the plug 256 toward an open position). Accordingly, the closing force applied to the plug 256 should overcome pressure force from below the plug 256. Further, where the shaft 252 may include some play (see, e.g., $\Delta z$, etc.), the closing force applied to the plug 256 may cause the plug 256 to self-center with respect to the wastegate seat 226 (e.g., to facilitate sealing, to avoid exhaust leakage, etc.).

In the example of FIG. 2, the axes of the bore 212, the bushing 242 and the shaft 252 are shown as being aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

As an example, a plug may include a contact portion and an aerodynamic portion. For example, a plug may include a radiused portion as a contact portion that contacts a surface of a wastegate seat in a closed state and an aerodynamic portion that defines a flow passage with respect to the surface of the wastegate seat in an open state. In such an example, the aerodynamic portion may extend into a wastegate passage in the closed state (e.g., without contacting a surface that defines the wastegate passage, a surface of the wastegate seat, etc.). As an example, in an assembly, such a plug may be configured to self-center with respect to a wastegate seat (e.g., in a closed state). As an example, a surface of a wastegate seat may be conical, which may facilitate self-centering of a contact portion of a plug. As an example, one or more clearances may exist in an assembly for a wastegate shaft with respect to a bushing such that the wastegate shaft may move in a manner that allows for self-centering of a wastegate plug, operatively coupled to the wastegate shaft, with respect to a wastegate seat.

Figure 3:
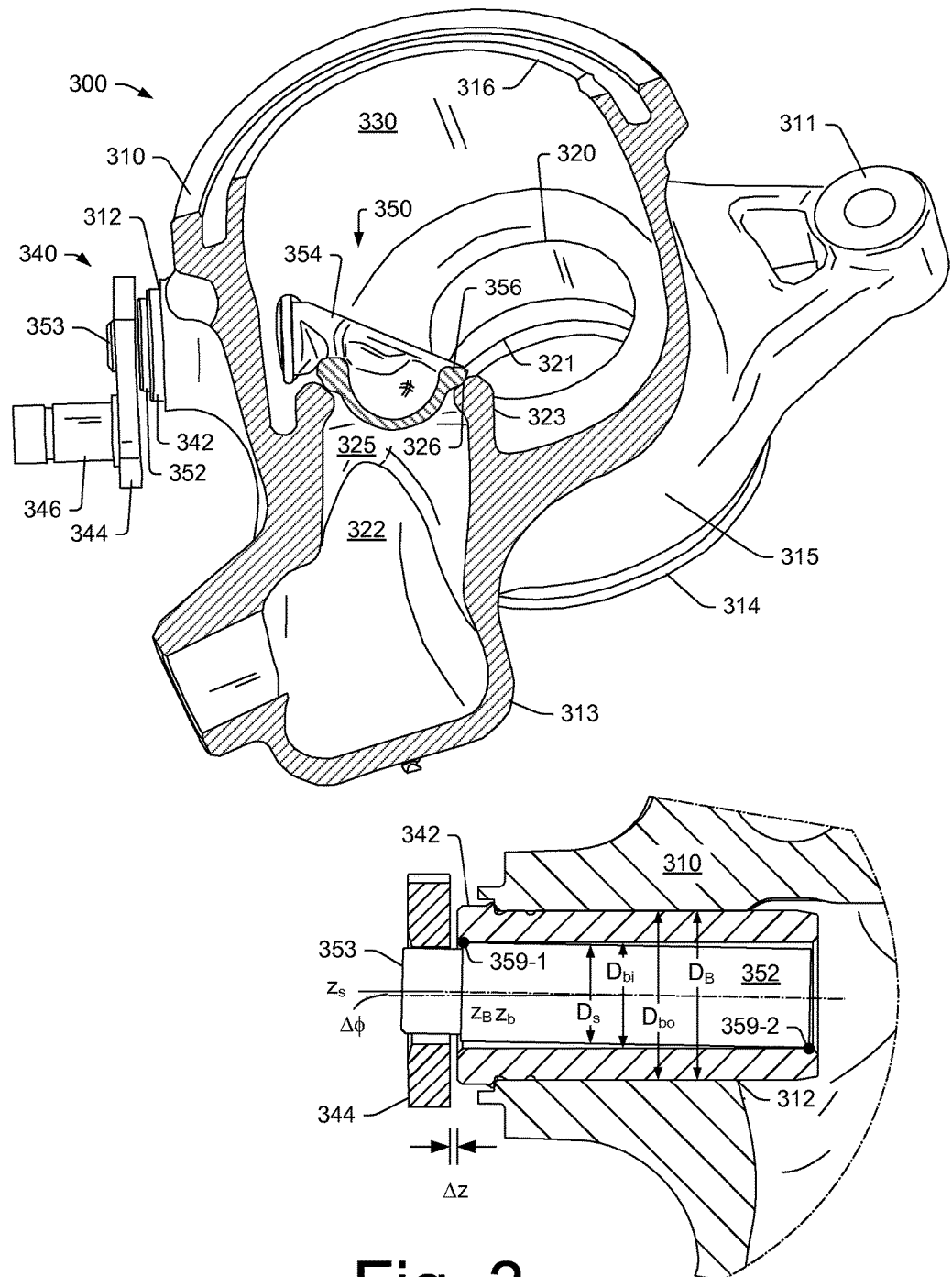
FIG. 3 is a series of views of an example of an assembly that includes a wastegate.

FIG. 3 shows an example of an assembly 300 that includes a wastegate arm and plug 350 that differs from the wastegate arm and plug 250 of the assembly 200 of FIG. 2. In particular, the wastegate arm and plug 350 includes a plug 356 that includes a substantially hemispherical shell portion 357.

In the example of FIG. 3 the assembly 300 includes a turbine housing 310 that includes a mounting flange 311, a bore 312, an inlet conduit 313, a turbine wheel opening 314, a spiral wall 315, an exhaust outlet opening 316, a shroud wall 320, a nozzle 321, a volute 322 formed in part by the spiral wall 315, a wastegate wall 323 that defines (e.g., at least in part) a wastegate passage 325 where the wastegate wall 323 extends to a wastegate seat 326 that may be an interface between the wastegate passage 325 and an exhaust chamber 330.

In the example of FIG. 3, the turbine housing 310 may be a single piece or multi-piece housing. As an example, the turbine housing 310 may be a cast component (e.g., formed via sand casting or other casting process). The turbine housing 310 includes various walls, which can define features such as the bore 312, the turbine wheel opening 314, the exhaust outlet opening 316, the chamber 330, etc. In particular, the wastegate wall 323 defines at least in part the wastegate passage 325, which is in fluid communication with the inlet conduit 313 where a wastegate control linkage 340 and the wastegate arm and plug 350 are configured for opening and closing the wastegate passage (e.g., for wastegating exhaust).

As an example, the assembly 300 may be fitted to an exhaust conduit or other component of an internal combustion engine (see, e.g., examples of FIG. 1), for example, via a flange (see, e.g., the flange 211 of FIG. 2) such that exhaust is received via the inlet conduit 313, directed to the volute 322. From the volute 322, exhaust is directed via the nozzle 321 to a turbine wheel disposed in the turbine housing 310 via the opening 314 to flow and expand in a turbine wheel space defined in part by the shroud wall 320. Exhaust can then exit the turbine wheel space by flowing to the chamber 330 and then out of the turbine housing 310 via the exhaust outlet opening 316. As to wastegating, upon actuation of the control linkage 340 (e.g., by an actuator coupled to the peg 346), the wastegate arm and plug 350 may be rotated such that at least a portion of the received exhaust can flow in the wastegate passage 325 (e.g., as defined at least in part by the wastegate wall 323), past the wastegate seat 326 and into the chamber 330, rather than through the nozzle 321 to the turbine wheel space. The wastegated portion of the exhaust may then exit the turbine housing 310 via the exhaust outlet opening 316 (e.g., and pass to an exhaust system of a vehicle, be recirculated in part, etc.).

In the example of FIG. 3, the wastegate control linkage 340 includes a bushing 342 configured for receipt by the bore 312 of the turbine housing 310, a control arm 344 and a peg 346 and the wastegate arm and plug 350 includes a shaft 352, a shaft end 353, an arm 354 and the plug 356. As shown, the bushing 342 is disposed between the bore 312 and the shaft 352, for example, to support rotation of the shaft 352, to seal the chamber 330 from an exterior space, etc. The bore 312, the bushing 342 and the shaft 352 may each be defined by a diameter or diameters as well as one or more lengths. For example, the shaft 352 includes a diameter $D_s$, the bore 312 includes a diameter $D_B$ while the bushing 342 includes an inner diameter $D_{bi}$ and an outer diameter $D_{bo}$. In the example of FIG. 3, when the various components are assembled, the diameters may be as follows: $D_B > D_{bo} > D_{bi} > D_s$. As to lengths, a length of the shaft 352 exceeds a length of the bushing 342, which exceeds a length of the bore 312. Such lengths may be defined with respect to a shaft axis $z_s$, a bushing axis $z_b$ and a bore axis $z_B$.

In an enlarged cutaway view, the shaft 352 is shown as including an axis $z_s$ that may become misaligned with an axis $z_b$ of the bushing 342. For example, the bushing 342 may be received with minimal radial clearance with respect to the bore 312 of the housing 310 while a radial clearance may exist (e.g., a larger radial clearance) between the shaft 352 and an inner surface of the bushing 342. In such a manner, the shaft 352 may tilt with respect to the axis of the bushing 342 and, for example, the axis of the bore 312. In the example of FIG. 3, contact points 359-1 and 359-2 are shown, which may determine a maximal extent of misalignment with respect to tilting of the axis of the shaft 352 with respect to the axis of the bushing 342. As an example, such tilt may be represented by a tilt angle $\Delta\phi$.

The enlarged cutaway view of FIG. 3 also shows an axial gap $\Delta z$ that exists between an outwardly facing end of the bushing 342 disposed at an axial position and an inwardly facing surface of the control arm 344 disposed at an axial position. In such an example, the axial gap may be defined by the difference between these two axial positions. As shown in the example of FIG. 3, the shaft 352 may be able to move axially where the axial distance may be limited in part by the end of the bushing 342, which defines, in part, the axial gap $\Delta z$. For example, the inwardly facing surface of the control arm 344 may contact the end of the bushing 342, which, in turn, may limit axial inward movement of the shaft 352.

As illustrated in the example of FIG. 3, the shaft 352 may tilt and may move axially where such movements may be limited (see, e.g., $\Delta z$ and $\Delta\phi$)). As an example, the wastegate arm and plug 350 may act to self-center with respect to the wastegate seat 326 responsive to force applied to the control arm 344 (e.g., which is transmitted to the wastegate arm and plug 350 via the shaft 352). In such an example, self-centering may occur for effective sealing of the wastegate within the range of clearances that allow for axial and/or angular movement of the shaft 352.

As an example, during operational use, one or more clearances between various components (e.g., plug, arm, shaft, bore, bushing, etc.) may change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it may be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

Figure 4:
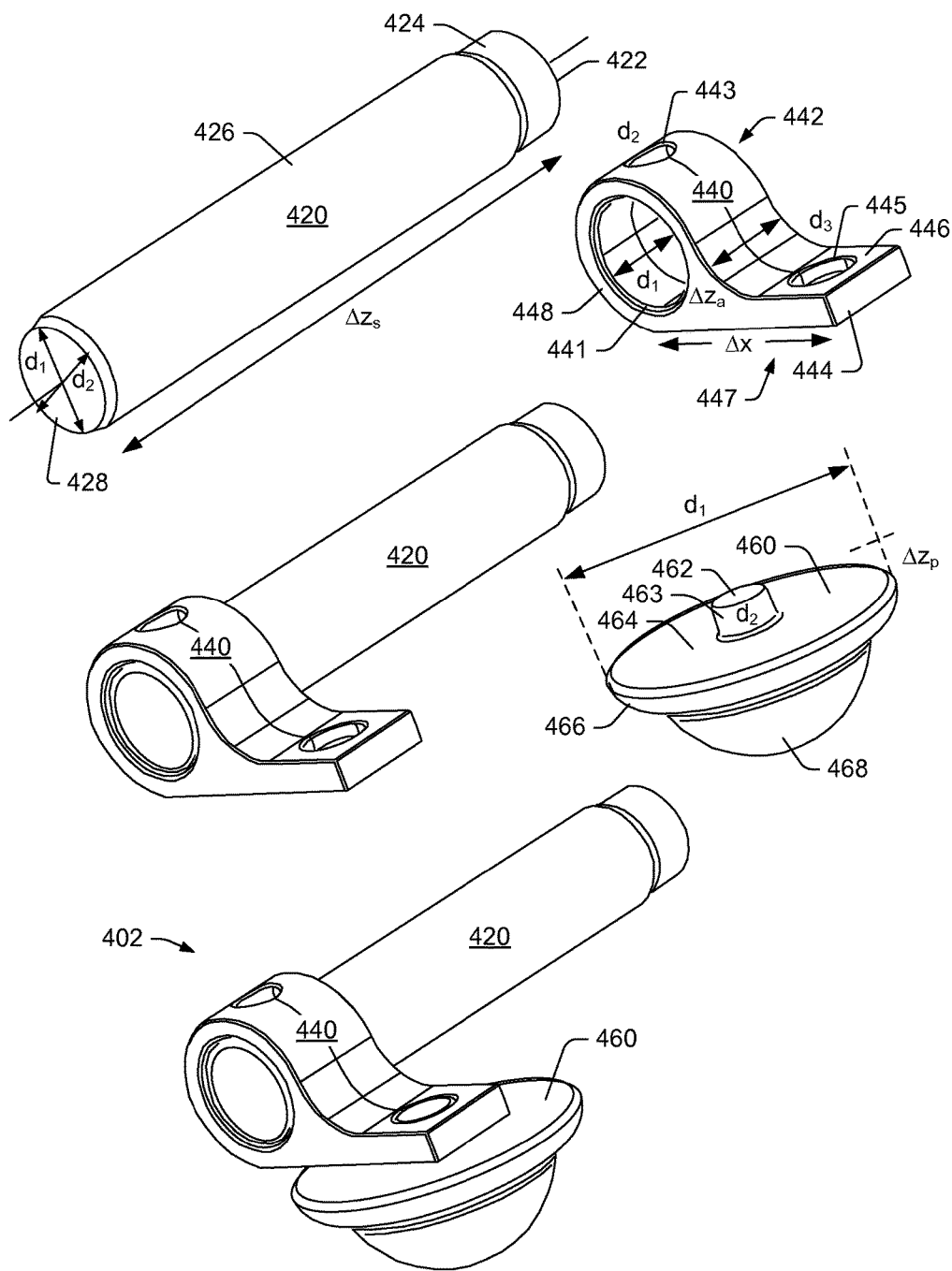
FIG. 4 is a series of views of examples of pieces that can be assembled to form a unit.
Figure 5:
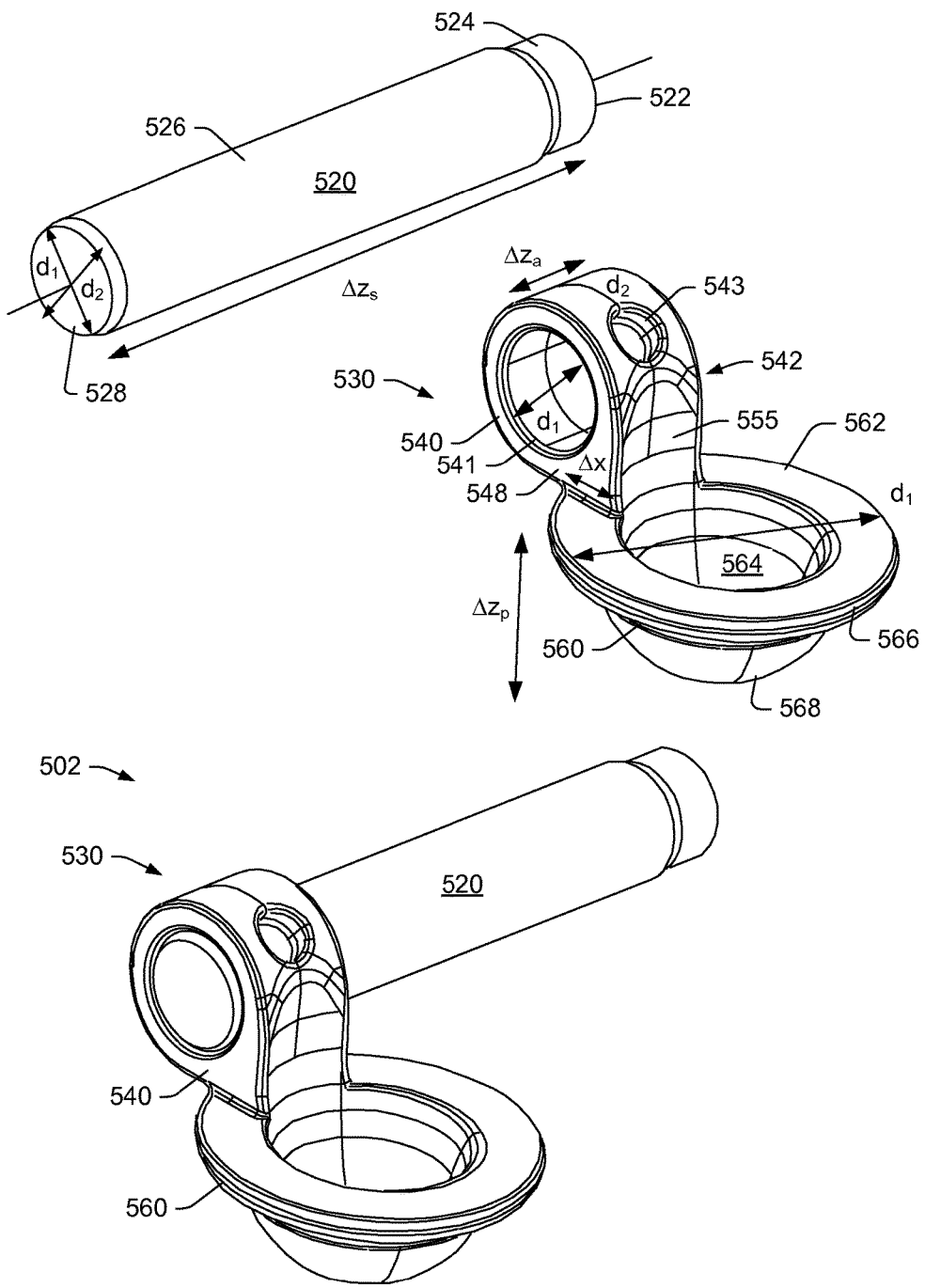
FIG. 5 is a series of views of examples of pieces that can be assembled to form a unit.
Figure 6:
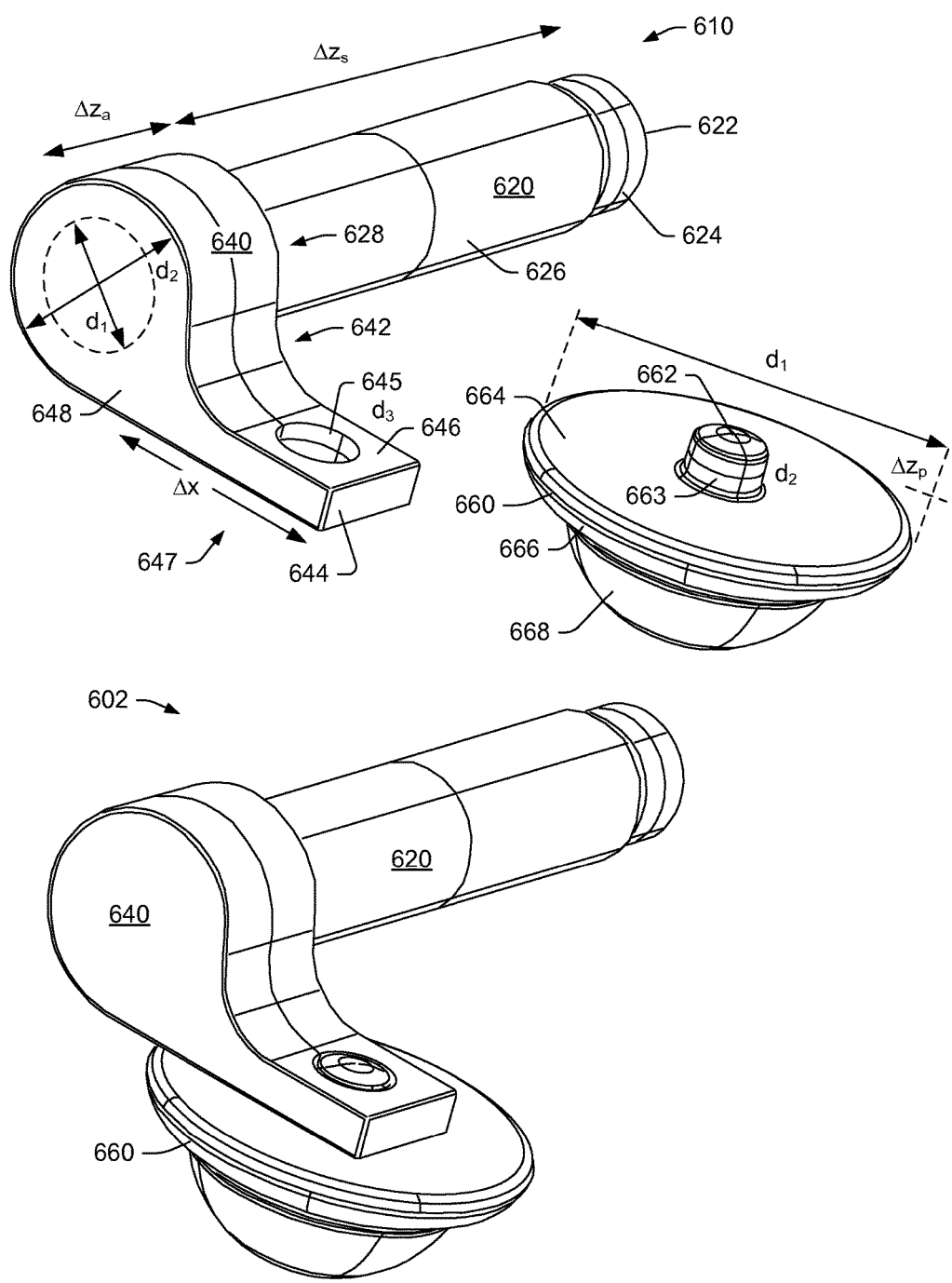
FIG. 6 is a series of views of examples of pieces that can be assembled to form a unit.

FIGS. 4, 5 and 6 show examples of wastegate shaft, arm and plug units 402, 502 and 602.

As shown in FIG. 4, the unit 402 may be assembled from a shaft 420, an arm 440 and a plug 460. The shaft 420 includes a control arm end 442, a first portion 442, a second portion 426 and a wastage end 428. The shaft 420 includes a length $\Delta z_s$ and an outer diameter $d_1$ and a wastegate end diameter $d_2$, where a sloped or chamfered surface may transition from the outer diameter $d_1$ to the wastegate end diameter $d_2$. The arm 440 includes a bore 441 with a diameter $d_1$ that extends from a side 442 to a side 448, for example, over a length $\Delta z_a$. In the example of FIG. 4, the arm 440 also includes an opening 443 with a dimension $d_2$ and a tongue portion that extends to a tongue end 444 (see, e.g., the dimension $\Delta x$) where an opening 445 spans between an upper surface 446 and a lower surface 447 and has a dimension $d_3$. The plug 460 includes a peg end 462 of a peg 463 that extends above a surface 464, which has a dimension $d_1$. As shown, the peg 463 has a dimension $d_2$ and a height $\Delta z_p$. In the example of FIG. 4, the plug 460 includes a plug surface 466 and an aerodynamic surface 468. The plug 460 has an outer dimension $d_1$. As an example, the plug surface 466 may be a portion of a torus and, as an example, the aerodynamic surface 468 may be a portion of a sphere or a modified sphere. As an example, the aerodynamic portion may be a spherical cap, a modified spherical cap, etc. As an example, the lower surface 447 of the arm 440 may be substantially flat (e.g., planar) and the surface 464 may include a mating surface region that can abut the lower surface 447 of the arm 440. In such an example, an alignment may be achieved for the peg 463 in the opening 445 of the tongue portion of the arm 440. As an example, the peg 463 may be fit into the opening 445 via an interference fit or for example with an amount of clearance, which may allow for tilt of an axis of the plug 460 with respect to the arm 440. Where clearance exists, tilt of the peg 463 may provide, for example, for an alignment of the plug 460 with respect to a wastegate seat (e.g., to enhance sealing).

The unit 402 may be formed by coupling the arm 440 to the shaft 420 and by coupling the plug 460 to the arm 440. For example, the shaft 420 may be inserted at least partially into the bore 441 of the arm 440 and welding may occur via the opening 443 to fix the shaft 420 to the arm 440. The peg 463 of the plug 460 may be received by the opening 445 of the arm 440. Once received, welding may occur to fix the plug 460 to the arm 440 (e.g., to form one or more welds that couple the plug 460 to the arm 440). As an example, a weld may be formed with respect to the peg 463 and/or with respect to the surface 464 (e.g., to the tongue portion of the arm 440).

As shown in FIG. 5, the unit 502 may be assembled from a shaft 520, and a subunit 530 that includes an arm 540 and a plug 560. The shaft 520 includes a control arm end 542, a first portion 542, a second portion 526 and a wastage end 528. The shaft 520 includes a length $\Delta z_s$ and an outer diameter $d_1$ and a wastegate end diameter $d_2$, where a sloped or chamfered surface may transition from the outer diameter $d_1$ to the wastegate end diameter $d_2$.

As to the subunit 530, the arm 540 includes a bore 541 with a diameter $d_1$ that extends from a side 542 to a side 548, for example, over a length $\Delta z_a$. In the example of FIG. 5, the arm 540 also includes an opening 543 with a dimension $d_2$ and a tongue portion 555 that extends to the plug 560. As an example, a dimension $\Delta x$ may correspond to an annular "overlap" portion of the plug 560 (e.g., where a transition occurs from the arm 540 to the plug 560).

In the example of FIG. 5, the plug 560 includes a plug surface 566 and an aerodynamic surface 568, which may be surface of a shell where the plug 560 includes an inner shell surface 564. The plug 560 has an outer dimension $d_1$ and extends an axial plug distance $\Delta z_p$. As an example, the plug surface 566 may be a portion of a torus and, as an example, the aerodynamic surface 568 may be a portion of a sphere or a modified sphere.

The unit 502 may be formed by coupling the subunit 530 to the shaft 520. For example, the shaft 520 may be inserted at least partially into the bore 541 of the arm 540 and welding may occur via the opening 543 to fix the shaft 520 to the arm 540. As an example, the bore 541 may be defined in part via an axis where the axis of the shaft may be substantially aligned with the axis of the bore 541. As an example, a clearance may exist between an outer surface of the second portion 526 of the shaft 520 and an inner surface of the bore 541. As an example, welding may fix the position of the shaft 520 with respect to the bore 541, for example, optionally where axes thereof substantially align or where an amount of tilt may exist between the two axes that may act to position the plug 560 with respect to a wastegate seat for a closed orientation of the plug 560 (e.g., to enhance sealing).

As shown in FIG. 6, the unit 602 may be assembled from a subunit 610 that includes a shaft 620 and an arm 640 and from a plug 660. The shaft 620 includes a control arm end 642, a first portion 642, a second portion 626 and a wastage end 628. The shaft 620 includes a length $\Delta z_s$ and an outer diameter $d_1$. The arm 640 includes a wastegate end dimension $d_2$ that may extend from a side 642 to a side 648, for example, over a length $\Delta z_a$. In the example of FIG. 6, the arm 640 also includes a tongue portion that extends to a tongue end 644 (see, e.g., the dimension $\Delta x$) where an opening 645 spans between an upper surface 646 and a lower surface 647 and has a dimension $d_3$.

The plug 660 includes a peg end 662 of a peg 663 that extends above a surface 664, which has a dimension $d_1$. As shown, the peg 663 has a dimension $d_2$ and a height $\Delta z_p$. In the example of FIG. 6, the plug 660 includes a plug surface 666 and an aerodynamic surface 668. The plug 660 has an outer dimension $d_1$. As an example, the plug surface 666 may be a portion of a torus and, as an example, the aerodynamic surface 668 may be a portion of a sphere or a modified sphere.

The unit 602 may be formed by coupling the plug 660 to the arm 640 of the subunit 510. For example, the peg 663 of the plug 660 may be received by the opening 645 of the arm 640. Once received, welding may occur to fix the plug 660 to the arm 640. As an example, a weld may be formed with respect to the peg 663 and/or with respect to the surface 664 (e.g., to the tongue portion of the arm 640). As an example, the lower surface 647 of the arm 640 may be substantially flat (e.g., planar) and the surface 664 may include a mating surface region that can abut the lower surface 647 of the arm 640. In such an example, an alignment may be achieved for the peg 663 in the opening 645 of the tongue portion of the arm 640. As an example, the peg 663 may be fit into the opening 645 via an interference fit or for example with an amount of clearance, which may allow for tilt of an axis of the plug 660 with respect to the arm 640. Where clearance exists, tilt of the peg 663 may provide, for example, for an alignment of the plug 660 with respect to a wastegate seat (e.g., to enhance sealing).

As an example, various pieces may be manufactured using a process such as, for example, a wax casting process or other casting process (e.g., foam, etc.).

As an example, a cluster may be formed with a plurality of pieces to be cast. For example, in investment casting or lost wax casting, a method can include assembling patterns (e.g., made of a material such as wax, etc.). Such an approach allows for manufacture of a plurality pieces at a time (e.g., per casting cycle, etc.). As an example, an assembly of patterns may be attached to a sprue (e.g., consider a wax sprue, etc.) where the result may be referred to as a cluster, a pattern cluster or a tree.

As an example, a cluster may be subjected to one or more treatments (e.g., coatings, etc.), for example, to form an investment. An investment may be, for example, produced via coating, stuccoing, and hardening. Coating may include dipping a cluster into a slurry of refractory material where the material may be used to provide a smooth surface finish, reproduce details, etc. A cluster treated with refractory material may then be stuccoed, for example, with ceramic particles (e.g., via a fluidized bed, a rainfall-sander, a hand, etc.). In such an example, the particles may then be allowed to harden.

As an example, an investment formed using wax may be dewaxed to prepare an investment mold, which may be an investment cluster mold. Such a mold may be positioned in a vessel that can receive sand or other material, which may then be compacted, for example, using a vibration table. Once compacted, molten material may be introduced into the investment mold to form one or more pieces. For example, an investment cluster mold may be used to form a tree of pieces where individual pieces may be removed from the tree.

As an example, a monoblock shaft, arm and plug unit may be made via a casting process. However, the size of the monoblock can impact "packing" in a casting process (e.g., number of pieces per tree, size of a tree, etc.). For example, given a fixed chamber size (e.g., a sand chamber, etc.) for a casting process, a certain number of pieces (e.g., units) may be made per casting cycle.

As an example, a shaft, arm and plug may be formed via two or more pieces where at least one of the pieces is cast. In such an example, the size of an individual cast piece being less than that of a monoblock shaft, arm and plug unit, the number of pieces formed per casting cycle can be increased. Such an approach may reduce casting cost.

As an example, a method of assembling two or more pieces of a shaft, arm and plug with respect to a turbine housing can produce an arrangement of components that is customized when compared to a method that installs a monoblock shaft, arm and plug unit.

As an example, a method can include casting a plurality of individual pieces that can be assembled to form a wastegate shaft, arm and plug unit and assembling at least one of the pieces in a turbine housing. In such an example, at least one action of the assembling can occur with the plug of the unit in a closed orientation with respect to a wastegate seat of a wastegate opening of the turbine housing. Such a method can customize fit of a plug with respect to an arm and a shaft and with respect to a wastegate seat. A customized fit can enhance sealing between the plug and the wastegate seat. For example, a customized fit for a plug in a closed orientation may reduce risk of exhaust leakage, reduce amount of exhaust leakage, etc. Such an approach may reduce movement of a shaft, arm and plug with respect to a bore, a bushing, a control arm, a control linkage, a controller, etc. In turn, intended controllability, emissions, longevity, etc. may be maintained and/or improved.

As an example, one or more pieces may be from a blank (e.g., a blank bar). As an example, one or more pieces may be cast (e.g., from a molten material that can harden upon cooling). As an example, a material of construction of a piece may be a metal. As an example, a material of construction of a piece may be an alloy. As an example, a material (e.g., a metal, an alloy, etc.) may be selected based on operational conditions (e.g., operational conditions of an exhaust gas turbine) and, for example, ability to be welded to another piece. As an example, a unit may be formed of a high temperature metal and/or a high temperature alloy. As an example, a piece may be formed of an alloy such as, for example, a NiCrFe-based alloy (e.g., HASTALLOY™ material, INCONEL™ material, etc.) or another alloy. As an example, a piece may be formed of a stainless steel or another type of steel.

As to the unit 402 of FIG. 4, manufacturing may include making three individual pieces 420, 440 and 460 per unit 402. As an example, a shaft may be turned from stock material (e.g., a blank, etc.) to achieve desired characteristics (e.g., tolerance, surface finish, etc.). As an example, the arm 440 may be cast and the plug 460 may be cast or, for example, formed via turning, machining, etc.

To form the unit 402, welding may be employed once the arm 440 is in a closed orientation with respect to the plug 460 disposed in contact with a wastegate seat of a turbine housing. In such an example, an isostatic condition may be achieved for the unit 402, optionally as actuated by a controller. Such an approach may reduce risk of leakage between the plug 460 and the turbine housing and may achieve desired tolerances, clearances, etc. with respect to one or more control linkage components, etc. As an example, a method may include actuating an actuator or surrogate actuator prior to welding.

As to the unit 502, manufacturing can include making two individual pieces 520 and 530 per unit 502. As an example, a shaft may be turned from stock material to achieve desired characteristics (e.g., tolerance, surface finish, etc.). As an example, the subunit 530 may be cast (e.g., via wax, etc.).

To form the unit 502, welding may be employed once the subunit 530 is in a closed orientation with respect to the plug 560 thereof being disposed in contact with a wastegate seat of a turbine housing. In such an example, an isostatic condition may be achieved for the unit 502, optionally as actuated by a controller. Such an approach may reduce risk of leakage between the plug 560 and the turbine housing and may achieve desired tolerances, clearances, etc. with respect to one or more control linkage components, etc. As an example, a method may include actuating an actuator or surrogate actuator prior to welding.

As an example, some play may exist between the shaft 520 and the bore 541 of the arm 540 of the subunit 530. In such an example, upon application of force, an isostatic condition may be achieved in a closed orientation of the plug 660 with respect to a wastegate seat of a turbine housing. Where welding is employed, the weld may fix the isostatic arrangement of the shaft 520 in the bore 541 of the arm 540 of the subunit 530. As an example, a force diagram may illustrate various forces that can act on components where, for example, a substantially isostatic arrangement may be achieved.

As to the unit 602, manufacturing may include making two individual pieces 610 and 660 per unit 602. As an example, the subunit 610 may be cast where the shaft 620 may be turned to achieve desired characteristics (e.g., tolerance, surface finish, etc.). As an example, the plug 560 may be cast or, for example, formed via turning, machining, etc.

To form the unit 602, welding may be employed once the arm 640 is in a closed orientation with respect to the plug 660 disposed in contact with a wastegate seat of a turbine housing. In such an example, an isostatic condition may be achieved for the unit 602, optionally as actuated by a controller. Such an approach may reduce risk of leakage between the plug 660 and the turbine housing and may achieve desired tolerances, clearances, etc. with respect to one or more control linkage components, etc. As an example, a method may include actuating an actuator or surrogate actuator prior to welding.

As mentioned, methods of assembly for the unit 402, the unit 502 and the unit 602 can enhance one or more characteristics of turbocharger that includes a housing with a wastegate seat.

Figure 7:
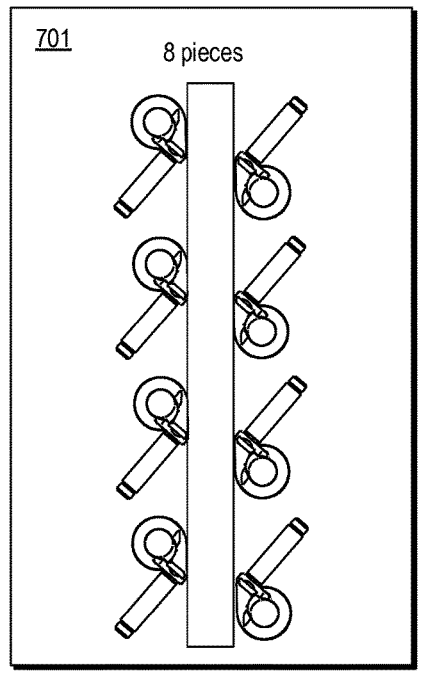
FIG. 7 is a series of views of examples of pieces of a casting process.
Figure 7:
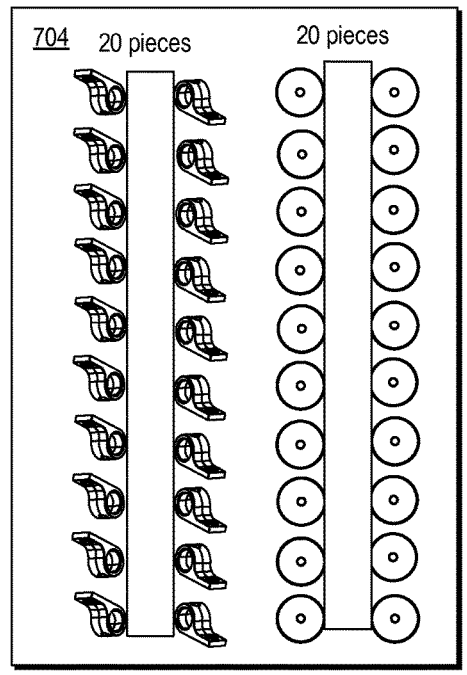
Figure 7:
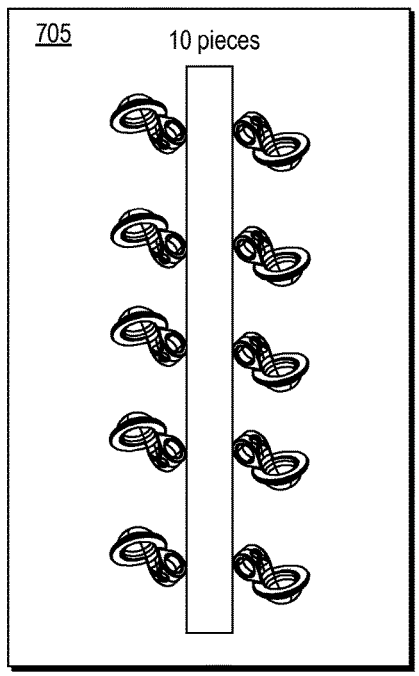
Figure 7:
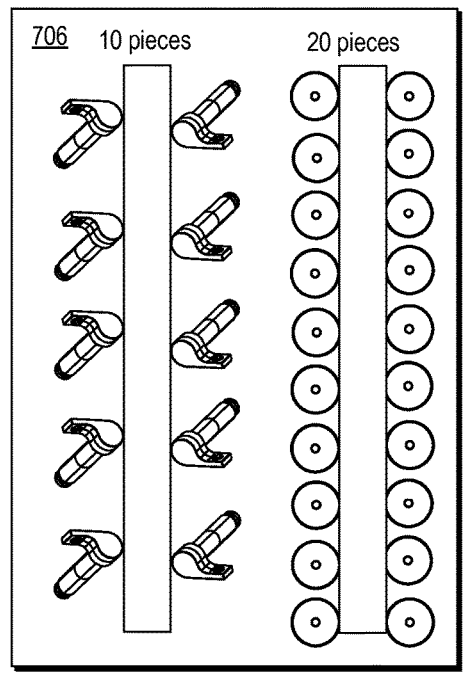

FIG. 7 shows examples of pieces 701, 704, 705 and 706. Such examples illustrate geometric "packing" of monoblock pieces 701, of pieces 704 of an example unit such as the unit 402, of pieces 705 of an example unit such as the unit 502 and of pieces 706 of an example unit such as the unit 602.

Figure 8:
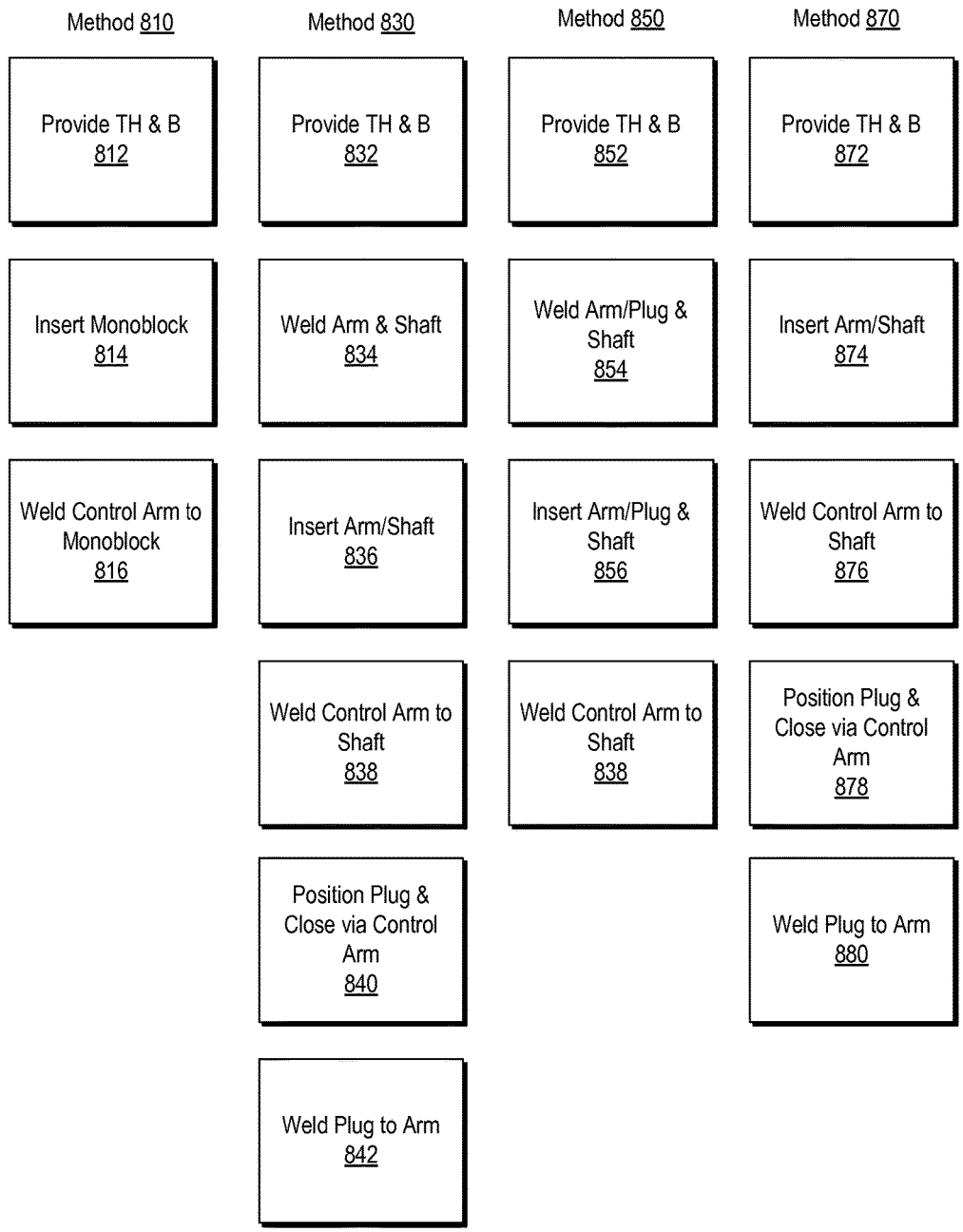
FIG. 8 is a series of block diagrams of example methods.

FIG. 8 shows examples of method 810, 830, 840 and 870. The method 810 includes providing a turbine housing and a bushing 812, inserting a monoblock shaft, arm and plug into a bore of the bushing 814 and welding a control arm to the shaft of the monoblock 816.

The method 830 includes providing a turbine housing and a bushing 832, welding an arm and shaft 834, inserting the arm and shaft as a subunit into a bore of the bushing 836, welding a control arm to the shaft of the subunit 838, positioning a plug and closing via the control arm 840, and welding the plug to the arm 842.

The method 850 includes providing a turbine housing and a bushing 852, welding an arm and plug subunit to a shaft 854, inserting the shaft into a bore of the bushing 856 and welding a control arm to the shaft 858. As an example, a method may include welding the arm and plug subunit to the shaft after the shaft has been inserted into the bore of the bushing.

The method 870 includes providing a turbine housing and a bushing 872, inserting a shaft of an arm and shaft subunit into a bore of the bushing 874, welding a control arm to the shaft 876, positioning a plug with respect to the arm and with respect to a wastegate seat of the turbine housing via the control arm 878 and welding the plug to the arm 880.

As an example, a method can include forming a shaft from a blank (e.g., a blank bar, etc.), forming an arm via a casting process and forming a plug from a blank (e.g., a blank bar, etc.). For example, consider the unit 402 of FIG. 4 where the shaft 420 is formed from a blank, the arm 440 is formed via a casting process and where the plug 460 is formed from a blank. Such components may be provided, for example, as part of a method such as, for example, the method 830 of FIG. 8.

As an example, a method can include forming a shaft from a blank (e.g., a blank bar, etc.) and forming an arm and plug component (e.g., a unit) via a casting process. For example, consider the unit 502 of FIG. 5 where the shaft 520 is formed from a blank and the arm 540 and the plug 560 is formed as a unit 530 via a casting process. Such components may be provided, for example, as part of a method such as, for example, the method 850 of FIG. 8.

As an example, a method can include forming a shaft and an arm as a component via a casting process and forming a plug from a blank (e.g., a blank bar, etc.) or via a casting process. For example, consider the unit 602 of FIG. 6 where the shaft 620 and the arm 640 are formed as a unit via a casting process and where the plug 660 is formed from a blank or via a casting process (e.g., optionally depending on shape, etc.). Such components may be provided, for example, as part of a method such as, for example, the method 870 of FIG. 8.

Figure 9:
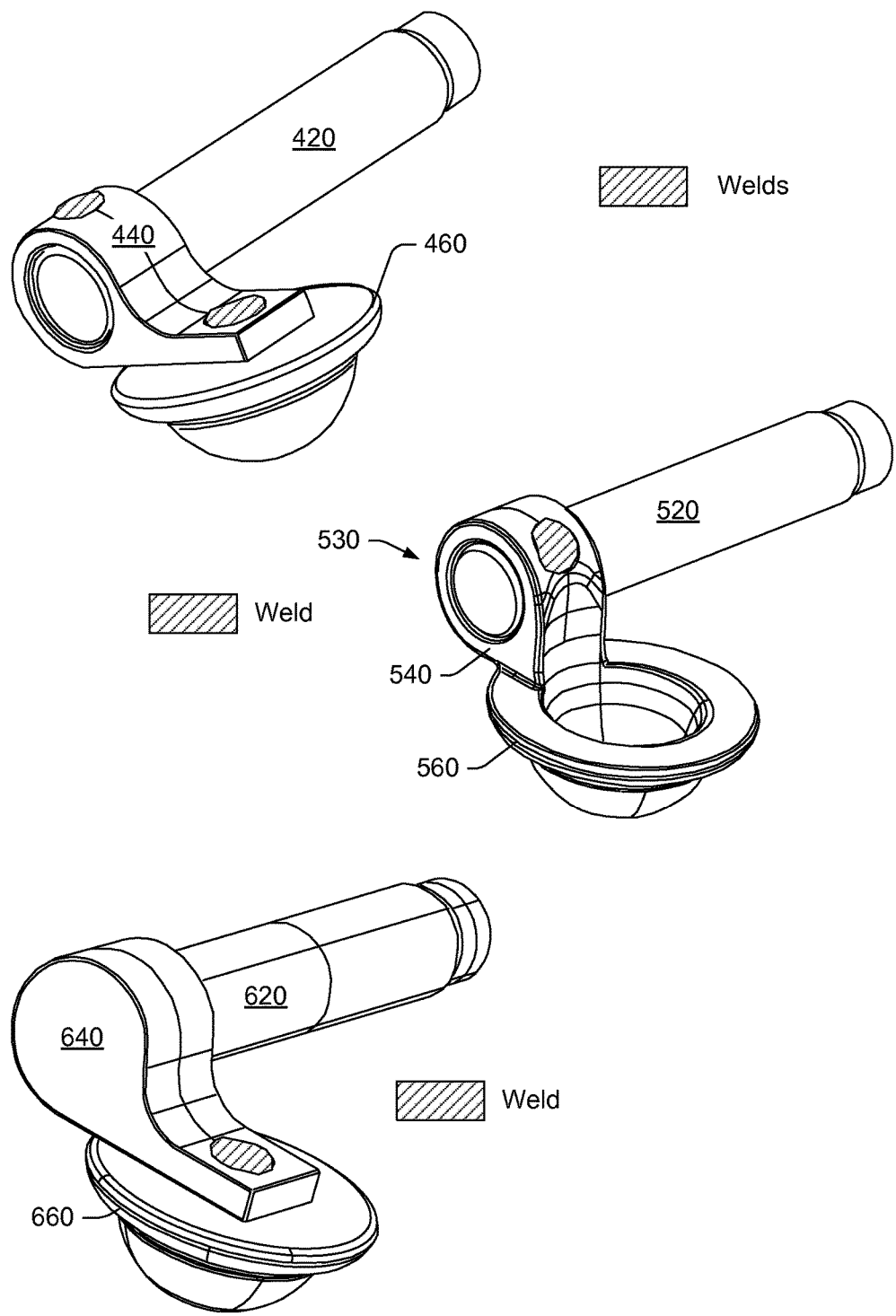
FIG. 9 is a series of perspective views of example units corresponding to FIG. 4, FIG. 5 and FIG. 6.

FIG. 9 shows the units 402, 502 and 602 along with example welds. For example, the unit 402 includes a weld as to the shaft 420 and the arm 440 and a weld as to the arm 440 and the plug 460; the unit 502 includes a weld as to the shaft 520 and the subunit 530; and the unit 602 includes a weld as to the subunit 610 and the plug 660.

As an example, a weld may be formed, for example, at one or more other locations, additionally or alternatively. For example, consider a weld between a side surface and/or a lower surface of a tongue portion of an arm and a lower surface of a plug, a weld between an arm and a shaft at an end of a bore of an arm, etc. As an example, a weld may be a tack weld that may followed by a stronger weld. As an example, a weld may include introducing a material that is or can be molten to form a weld or to participate in forming a weld. As an example, a weld may be formed via delivery of heat, generation of heat, etc. As an example, a weld may be formed via welding equipment (e.g., laser, electron beam, arc, etc.). As an example, a weld may be formed to withstand operating conditions (e.g., temperatures, etc.) of an exhaust gas turbine of a turbocharger operatively coupled to an internal combustion engine (e.g., gasoline, diesel, flex-fuel, bi-fuel, etc.).

In FIG. 9, the plugs 460, 560 and 660 can include a shape such as, for example, a shape of a hemisphere. As shown, the plug 560 may be a substantially hemispherical shell. As an example, a spherical shell may be defined as a generalization of an annulus to three dimensions. As an example, a spherical shell may be defined as a region between two concentric spheres of differing radii. As an example, a hemispherical shell may be defined as a region between two hemispheres of differing radii. As an example, a substantially hemispherical shell may include a portion that may be defined by a portion of a first hemisphere and a portion of a second hemisphere.

As an example, a substantially hemispherical shell may have a center of mass (e.g., geometric centroid) that may be approximated as lying at a distance d along an axis from a base plane where the distance may be defined by a first radius r1 and a second radius r2. For example, the distance d may be defined as $3(r2^4-r1^4)/8(r2^3-r1^3)$. In comparison, the center of mass (e.g., geometric centroid) of a uniform solid hemisphere of radius r lies on the axis of symmetry at a distance of $3r/8$ from the base. As to volume, the volume of a solid hemisphere is $2/3\pi r^3$ and the volume of a hemispherical shell may be calculated by subtracting the volume of two hemispheres. As an example, a solid hemisphere with a radius of 1 cm may have a center of mass at about 0.375 cm from a base plane and a volume of about 2.1 cubic centimeters and a hemispherical shell with an outer radius of 1 cm and an inner radius of 0.8 cm may have a center of mass at about 0.45 cm from a base plane and a volume of about 1 cubic centimeter. Thus, in such an example, while the center of mass may be extended for the hemispherical shell with respect to the solid hemisphere, the overall mass is about one half that of the solid hemisphere. In such an example, where a plug is fashioned as a hemispherical shell rather than a solid hemisphere, the reduction in overall mass may be beneficial as to performance, controllability, etc. (e.g., the reduction in mass may overcome any detriment from a slight increase in center of mass away from a base plane, which may include an axis of rotation of a shaft).

Figure 10:
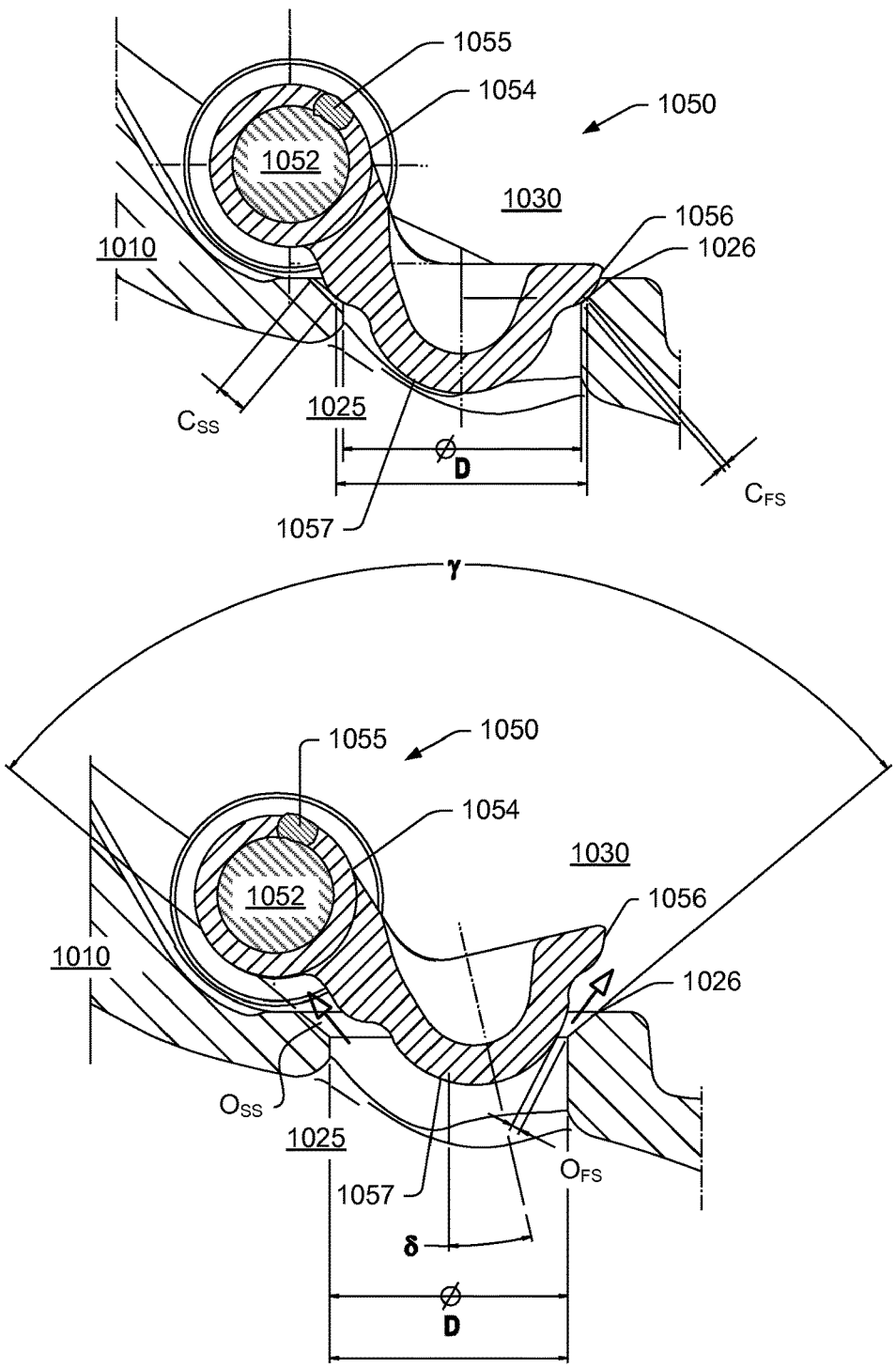
FIG. 10 is a series of cutaway views of an example of an assembly that includes a wastegate.

FIG. 10 shows a portion of an example of an assembly 1000 that includes a turbine housing 1010 that includes a bore 1012, a wastegate passage 1025, a wastegate seat 1026, a chamber 1030 and a wastegate arm and plug 1050. As shown in FIG. 10, the wastegate arm and plug 1050 is welded to a shaft 1052 via a weld 1055. As shown, a plug 1056 extends from an arm 1054 and a substantially hemispherical shell portion 1057 (e.g., aerodynamic portion) extends from the plug 1056 (e.g., seating portion).

In the example of FIG. 10, contact regions are indicated with respect to a shaft side and a free side (see, e.g., $C_{SS}$ and $C_{FS}$). As shown, the plug 1056 contacts the wastegate seat 1026 at a distance below an upper edge of the wastegate seat 1026 (see, e.g., $C_{FS}$) and contacts the wastegate seat 1026 at a distance above a lower edge of the wastegate seat 1026 (see, e.g., $C_{SS}$). As an example, a surface of contact may be defined with respect to the wastegate seat 1026 and a surface of contact may be defined with respect to the plug 1056.

As an example, force applied to the wastegate arm and plug 1050 may overcome exhaust pressure in the passage 1025 (e.g., a pressure differential between the passage 1025 and the chamber 1030) and such force may cause the plug 1056 to self-center with respect to the wastegate seat 1026 to provide an effective seal (e.g., minimal leakage of exhaust from the passage 1025 to the chamber 1030). As mentioned, clearances may exist that allow for some movement of the shaft 1052 with respect to a bushing and, for example, a bore. As an example, the plug 1056 and the wastegate seat 1026 may be shaped to provide for effective sealing via some amount of self-centering of the plug 756, for example, within clearance(s) that may exist that allow for movement of the shaft 1052. In other words, clearances may exist that allow for shaft movement that allows for self-centering of a plug with respect to a wastegate seat (e.g., for purposes of achieving effective sealing).

In the cutaway views of the assembly 1000 of FIG. 10, the plug 1056 is shown in a closed position and in an open position with respect to the wastegate seat 1026. Such views illustrate how a flow passage (e.g., opening between the passage 1025 and the chamber 1030) may be shaped by the substantially hemispherical shell portion 1057 of the wastegate arm and plug 1050.

FIG. 10 also shows various examples of dimensions. For example, the wastegate seat 1026 may be defined in part by a cone angle ($\gamma$). As an example, a relationship between the wastegate seat 1026 and the substantially hemispherical shell portion 1057 may be defined by an opening angle ($\delta$).

In the example of FIG. 10, open regions are indicated with respect to a shaft side and a free side (see, e.g., $O_{SS}$ and $O_{FS}$). These regions exist in three-dimensions, for example, as an annulus with a shape that depends on angle about a central axis of the wastegate seat 1026. As shown in the example of FIG. 10, exhaust may flow via these open regions (see, e.g., open-headed arrows).

As an example, an assembly may include a maximum angular misalignment of a shaft with respect to a bore axis of a bore (e.g., ±5 degrees), for example, where some angular misalignment with respect to a bushing axis of a bushing disposed in the bore (e.g., ±1 degree). For a variety of reasons, some misalignment may occur (e.g., during assembly, during operation, etc.). For example, FIG. 3 shows a tilt angle ($\Delta\phi$) for the shaft 352 with respect to the bushing 342 and, for example, the bore 312.

As an example, an assembly may include a maximum displacement misalignment (e.g., $\Delta$) of a shaft with respect to a bore axis of a bore (e.g., ±1.6 mm), for example, where some displacement misalignment with respect to a bushing axis of a bushing disposed in the bore (e.g., ±0.1 mm). For a variety of reasons, some misalignment may occur (e.g., during assembly, during operation, etc.). For example, FIG. 3 shows a tilt angle ($\Delta\phi$) for the shaft 352 with respect to the bushing 342 and, for example, the bore 312.

As an example, a wastegate arm and plug may include extreme positions inside a bushing disposed in a bore of a turbine housing while being able to maintain contact with a wastegate seat for purposes of sealing a wastegate passage (e.g., adequate sealing for acceptable performance). For example, the toroidal portion of the plug 356 (e.g., or the plug 460, the plug 560, the plug 660, or the plug 1056) may act to maintain contact with a wastegate seat (e.g., consider a conically shaped wastegate seat).

Figure 11:
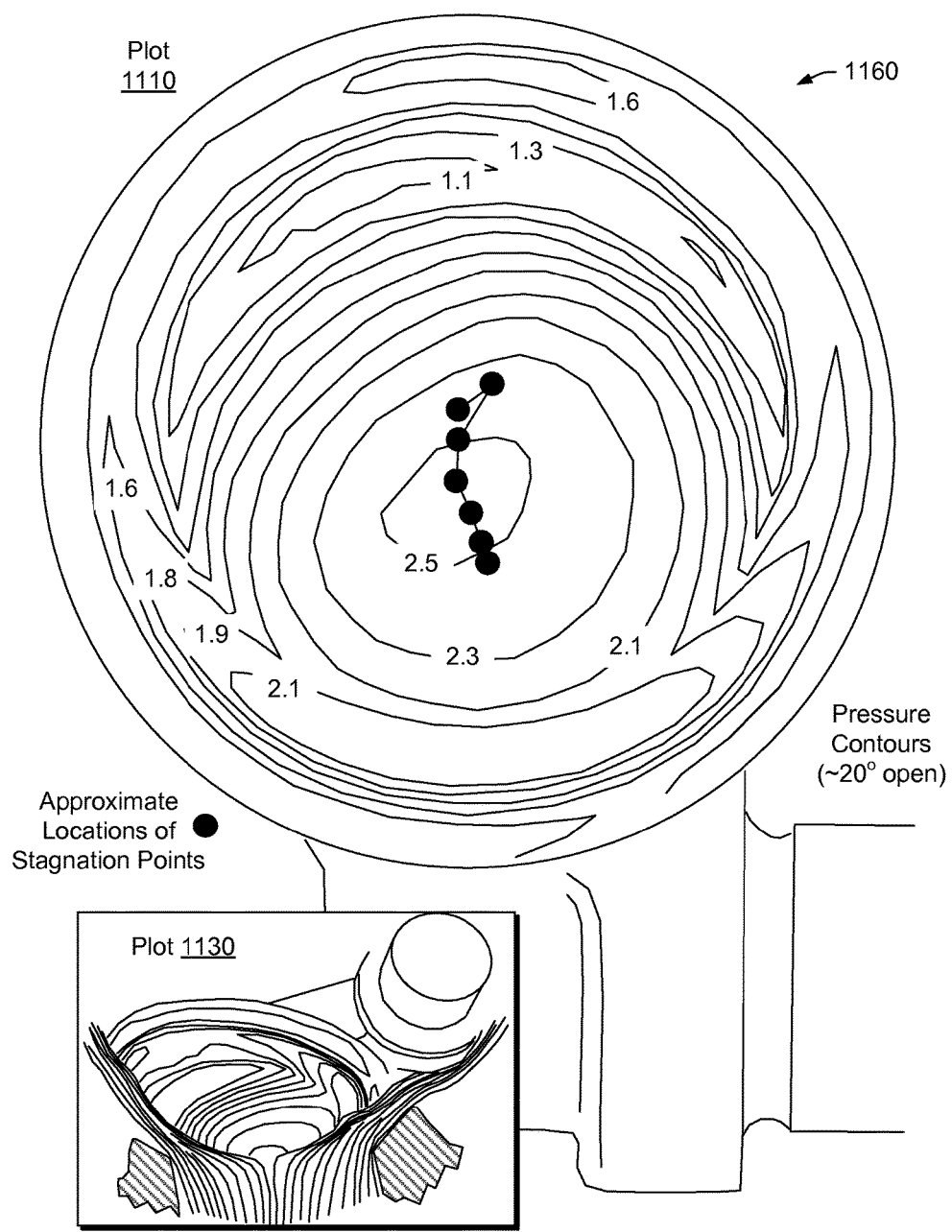
FIG. 11 is a series of diagrams of an example of a wastegate with respect to fluid flow.

FIG. 11 shows examples of plots 1110 and 1130 of trial data for a wastegate arm and plug in an assembly with a plug 1160. As shown in FIG. 11, the plot 1110 is a pressure contour plot for an open angle of about 20 degrees. In the plot 1110, a series of filled circles approximate locations of points (e.g., stagnation points or pressure maxima) over a range of angles from about 2.5 degrees open to about 30 degrees open (e.g., without correction of perspective of the plug). The plot 1130 shows flow streamlines as well as pressure contours, for example, to illustrate how exhaust flows through a plug-seat clearance for an open angle of about 20 degrees. As mentioned, a high pressure may correspond to a stagnation point about which flow is diverted radially outwardly to flow through a plug-seat clearance. As mentioned, for at least some open angles, both a toroidal portion of a plug and a modified sphere portion of a plug may define a plug-seat clearance. As open angle changes, the shape of the plug-seat clearance also changes. As illustrated in the example of FIG. 11, the locations of pressure maxima experienced by a plug over a range of open angles may be "controlled" at least in part by shape of the plug and, for example, at least in part by shape of a wastegate seat.

As an example, in fluid dynamics, a stagnation point may be a point in a flow field where local velocity of fluid is approximately zero. A stagnation point may exist at a surface of an object in a flow field, for example, where fluid is brought to rest by presence of the object in the flow field (e.g., consider a bluff body in a flow field). As an example, the Bernoulli equation may demonstrate how static pressure is highest where velocity is zero (e.g., such that static pressure or "stagnation pressure" may be at its maximum value at a stagnation point). Where the object is movable in a flow field via an actuator, the pressure experienced by the object may be transmitted to the actuator. If a movable object "catches" wind while being moved by an actuator (e.g., a sharp transition such as a step transition in pressure), the actuator may be impacted as well. As an example, the shape of the plug 356 may help reduce impact on an actuator as the actuator rotates the plug 356 with respect to a wastegate opening that provide for flow of exhaust.

As an example, a plug may be configured with two plug portions, for example, that extend from a lower surface of the plug (e.g., consider a cutting plane that cuts the plug to form a plane from which two plug portions extend downwardly therefrom). As an example, such plug portions may act to seal multiple exhaust passages (e.g., multiple wastegate passages) while plug portions (e.g., extensions) may extend into such passages to form clearances to direct exhaust flow (e.g., such plug portions may be configured to not contact a turbine housing, a wastegate passage wall, etc.).

As an example, a method such as one of the methods 830, 850 and 870 may be employed for a twin scroll turbine housing where a single wastegate seat exists for two exhaust passages with a dividing wall. In such an example, a plug can contact the single wastegate seat to suitably seal the passages.

As an example, plug portions may enhance operational dynamics (e.g., fluid dynamics) associated with two openings while another portion of a plug that acts to seal both openings (e.g., via a common valve seat).

Figure 12:
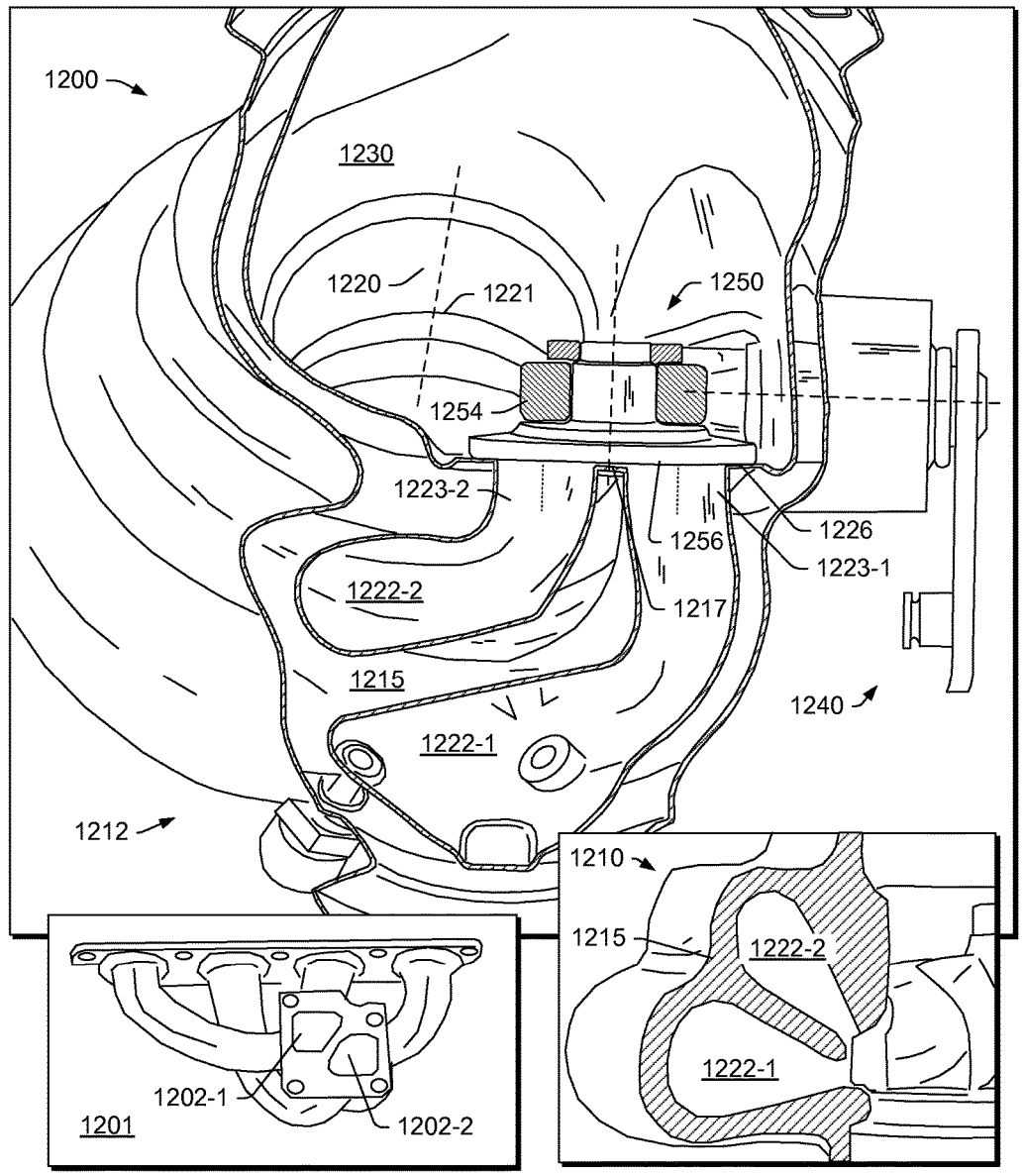
FIG. 12 is a series of views of an example of an assembly that includes two scrolls.

FIG. 12 shows an example of a twin scroll turbine assembly 1200 that may be configured to receive exhaust from a manifold 1201 that includes a two separate exhaust passages, each with its own opening 1202-1 and 1202-2. The assembly 1200 includes a housing 1210 that includes a wall 1215 that defines two scrolls 1222-1 and 1222-2 (e.g., two volutes) that can direct exhaust to a turbine wheel space, for example, via a nozzle or nozzles 1221. As an example, a turbine wheel space may be defined in part by a shroud wall 1220 located axially above the nozzle or nozzles 1221 that extends axially to an exhaust chamber 1230.

In the example of FIG. 12, the housing 1210 includes two wastegate walls 1223-1 and 1223-2 associated with respective scrolls 1222-1 and 1222-2. The two wastegate walls 1223-1 and 1223-2 form openings about which exists a wastegate seat 1226. As shown, the wastegate wall 1223-1 defines a first wastegate passage in fluid communication with a first inlet conduit and the wastegate wall 1223-2 defines a second wastegate passage in fluid communication with a second inlet conduit where, for example, the inlet conduits may be operatively coupled to respective openings 1202-1 and 1202-2 of the manifold 1201. As an example, the manifold 176 of FIG. 1 may be configured to be a divided manifold, for example, where the turbine housing assembly 172 may include twin scrolls (e.g., two volutes). As an example, the cylinder head 154 of FIG. 1 may include divided passages, for example, where the turbine housing assembly 152 may include twin scrolls (e.g., two volutes).

For control of exhaust flow through the wastegate passages, the assembly 1200 includes a wastegate control linkage 1240 and a wastegate arm and plug 1250 with an arm component 1254 and a plug component 1256 that are configured for opening and closing the wastegate passages (e.g., for wastegating exhaust) via seating of the plug component 1256 with respect to the wastegate seat 1026.

The assembly 1200 may be described, for example, with respect to various axes. For example, consider an axis of a turbine wheel space that may coincide with a rotational axis of a turbine wheel, an axis of a shaft of the wastegate arm and plug 1250 and an axis of the plug component 1256. Further, each of the openings of the wastegate passages may be defined by a respective axis, for example, where in a closed state of the wastegate, the axis of the plug component 1056 is approximately aligned parallel to the axes of the openings of the wastegate passages.

As an example, the manifold 1201 may be considered a divided manifold that separates flow of exhaust from cylinders whose cycles may interfere with one another (e.g., as to exhaust pulse energy). For example, on a four-cylinder engine with firing order 1-3-4-2, cylinder #1 is ending its expansion stroke and opening its exhaust valve while cylinder #2 still has its exhaust valve open (cylinder #2 is in its overlap period). In an undivided exhaust manifold, a pressure pulse from cylinder #1's exhaust blowdown event may be more likely to contaminate cylinder #2 with high pressure exhaust gas, which can impact performance of cylinder #2's (e.g., ability to breathe properly) and diminish pulse energy that may have been better utilized in by a turbine. As an example, a proper grouping for the aforementioned engine may keep complementary cylinders grouped together (e.g., exhaust of cylinders #1 and #4 as one complementary group and cylinders #2 and #3 as another complementary group). Such an approach may better utilize exhaust pulse energy and, for example, improve turbine performance (e.g., increase boost more rapidly).

Referring again to the assembly 1200, pulse energy may differ in the two passages 1223-1 and 1223-2 such that one portion of the plug component 1256 experiences different force than another portion of the plug 1256. Such differences may cause vibration, misalignment, wear, etc. For example, as the plug component 1256 includes a stem seated in an opening of the arm component 1254, pressure may cause the plug component 1256 to tilt such that an axis of the stem misaligns with respect to an axis of the opening of the arm component 1254. Over time, wear may occur (e.g., increased clearances), which may exacerbate wear, leakage, etc.

As to leakage, leakage may occur from a passage to the chamber 1030 and/or from one passage to another passage (e.g., and vice versa). For example, due to a pressure difference between the passages, exhaust may flow from the passage formed by the wall 1223-1 to the passage formed by the wall 1223-2 in a space above a divider wall surface 1217 and the plug component 1256. Such flow may act to "equalize" pressures, which may, for example, be detrimental to a divided manifold approach (e.g., or a twin scroll approach). Such flow may be referred to as scroll-to-scroll leakage that occurs for a closed operational state of a wastegate arm and plug (e.g., where a controller, actuator, etc. calls for the passages to be closed).

Figure 13:
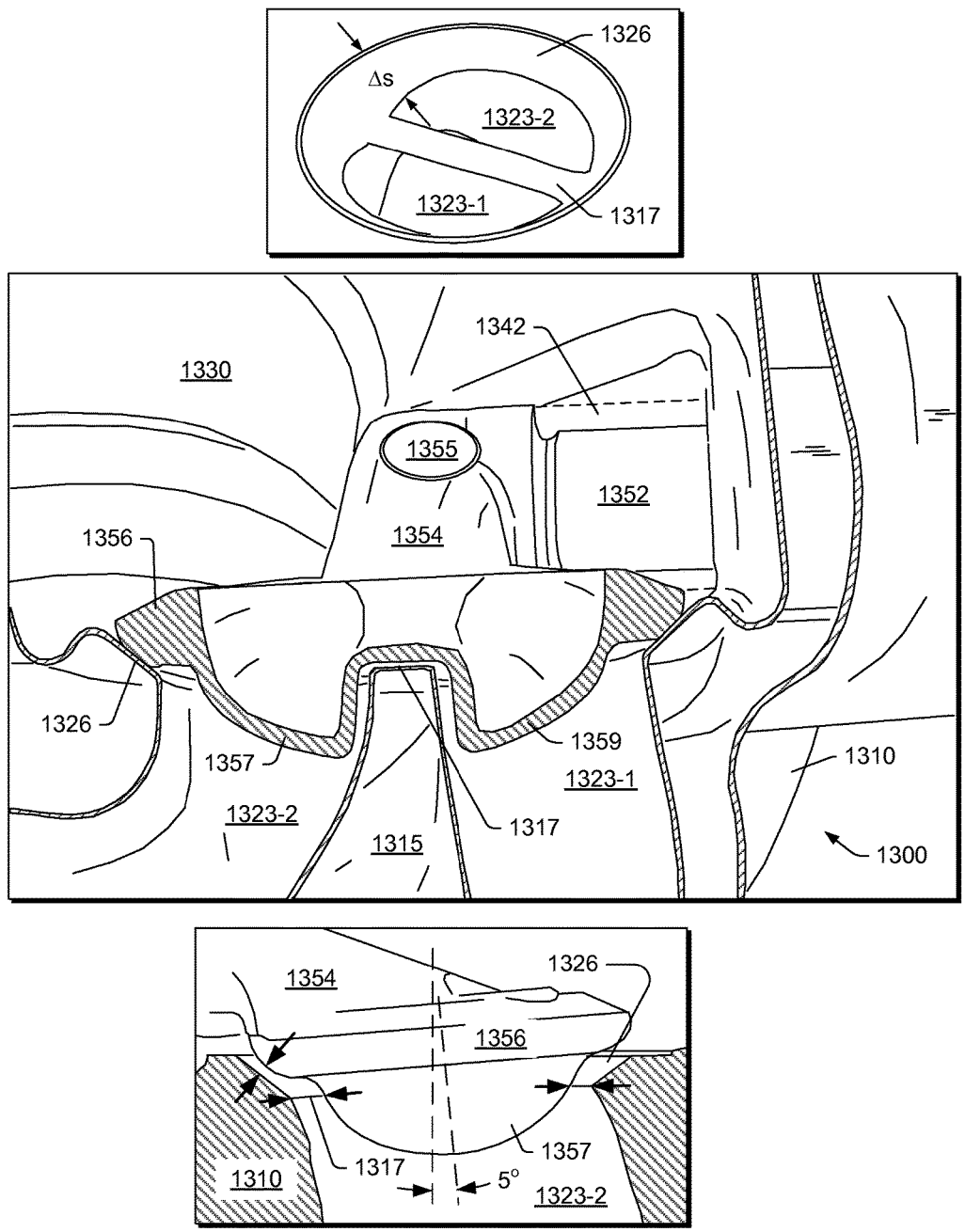
FIG. 13 is a series of views of an example of an assembly that includes two scrolls and an example of wastegate.

FIG. 13 shows two cutaway views of an example of an assembly 1300 that includes a housing 1310 and a wastegate arm and plug 1350 where a weld 1355 welds the arm and plug 1350 to a shaft 1352. As an example, as to welding to form the weld 1355, a method such as the method 850 of FIG. 8 may be employed.

FIG. 13 shows a wastegate seat 1326 where the wastegate arm and plug 1350 in conjunction with the wastegate seat 1326 may provide for a more progressive flow through a wastegate during wastegate valve opening. As an example, the wastegate seat 1326 may be defined in part by a conical surface.

As shown in the example of FIG. 13, the housing 1310 includes a wastegate walls 1323-1 and 1323-2 that extend to the wastegate seat 1326 and includes an exhaust chamber 1330. In the example of FIG. 13, the turbine housing 1310 may be a single piece or multi-piece housing. As an example, the turbine housing 1310 may be a cast component (e.g., formed via a casting process). As an example, the housing 1310 may be made of material (e.g., metal, alloy, etc.) suitable for temperatures experienced during operation of an exhaust turbine (e.g., of a turbocharger).

The turbine housing 1310 includes various walls, which can define features such as a bore, a turbine wheel opening, an exhaust outlet opening, etc. In particular, in the example of FIG. 13, the wastegate walls 1323-1 and 1323-2 define wastegate passages in fluid communication with inlet conduits (e.g., associated with a divided manifold) where a wastegate control linkage and a wastegate arm and plug 1350 are configured for opening and closing the wastegate passages (e.g., for wastegating exhaust). As an example, the assembly 1300 may include a bushing 1342 (see, e.g., dashed lines) that may be disposed in the bore of the turbine housing 1310 and that may abut the wastegate arm and plug 1350 (see, e.g., the bushing 242 of the assembly 200, the bushing 342 of the assembly 300, etc.).

In the perspective view, an example shape for the wastegate seat 1326 is illustrated, for example, where a seat depth (e.g., from the exhaust chamber 1330 to the space defined by the wastegate walls 1323-1 and 1323-2) may be greater on a shaft side (see, e.g., Δs) than on a front side. As shown a divider wall surface 1317 is disposed, for example, at an axial location that is about the level of a lower edge of the conical shaped wastegate seat 1326. As shown in the cutaway view, the two plug portions 1357 and 1359 descend below the divider wall surface 1317 (e.g., of the wall 1315) to form an approximately inverted U-shaped clearance, which may offer resistance to flow of exhaust between passages formed by the walls 1323-1 and 1323-2. Referring again to the assembly 1200 of FIG. 12, a clearance exists between the divider wall surface 1217 and the plug 1256 that does not offer such resistance to flow of exhaust between passages formed by the walls 1223-1 and 1223-2 (e.g., a flow may occur directly across the divider wall surface 1317). As an example, resistance to exhaust flow between such passages may help preserve benefits provided by a divided manifold operatively coupled to a twin scroll turbine housing (e.g., of a turbocharger).

FIG. 13 shows how a toroidal portion and two plug portions 1357 and 1359 of the plug 1356 may be oriented with respect to the wastegate seat 1326, which may be a conical seat. As shown, the toroidal portion of the plug 1356 can seat against the wastegate seat 1326 when the wastegate arm and plug 1350 is in a closed position. Further, in a closed position, a clearance exists about each of the two plug portions 1357 and 1359 (e.g., the two plug portions 1357 and 1359 do not contact the wastegate seat 1326).

As shown in a lower cutaway view, when the wastegate arm and plug 1350 is in an open position of approximately 5 degrees (e.g., about 5 degrees of rotation of the shaft 1352 in a bore of the housing 1310), surfaces of the two plug portions 1357 and 1359 of the plug 1356 define clearances with respect to the wastegate seat 1326 (see, e.g., front side and shaft side arrows). Where a pressure differential exists (e.g., higher pressure on the wastegate wall side 1323-1 and/or 1323-2), exhaust may flow through the clearances where characteristics of such flow is determined, in part, by the surfaces of the two plug portions 1357 and 1359 of the plug 1356 and, in part, by the surface of the wastegate seat 1326. For example, flow may impinge against the surfaces of the two plug portions 1357 and 1359 of the plug 1356, for example, to form a stagnation point on each of the two plug portions 1357 and 1359 about which flow is diverted radially outwardly therefrom and, for example, toward a clearance between the plug 1356 and the wastegate seat 1326. As an example, a "smooth" (e.g., streamlined) flow profile may help to reduce vibration, chatter, etc. of one or more components of a wastegate mechanism, which, in turn may act to reduce wear, enhance reliability, etc.

Further, as shown in the example of FIG. 13, on a shaft side of the plug 1356, the toroidal portion of the plug 1356 also defines a clearance with respect to the wastegate seat 1326 (e.g., where rotation rotates the front side of the plug 1356 a greater arc distance than the shaft side of the plug 1356). Accordingly, in the example of FIG. 13, for the assembly 1300, both the toroidal portion and the two plug portions 1357 and 1359 of the plug 1356 define clearances with respect to the wastegate seat 1326 of the housing 1310. These clearances (e.g., over a range of "open" angles), act to "control" characteristics of exhaust flow. For example, flow characteristics may be controlled by inter-component clearance shapes over a range of open angles in a manner that enhances controllability of a wastegate. As an example, the assembly 1300 may provide for a monotonic and smooth evolution of pressure with respect to wastegate valve opening where such characteristics enhance controllability of the wastegate valve. Such an approach may particularly enhance control where a wastegate valve actuator is a mechanical vacuum actuator (e.g., an actuator to rotate a wastegate arm and plug with respect to a wastegate seat).

As an example, an assembly such as the assembly 1300 may be operatively coupled to a manifold such as the manifold 1201 of FIG. 12 or the manifold 176, which may be a divided manifold. As an example, an assembly such as the assembly 1300 may be operatively coupled to a cylinder head such as the cylinder head 154 of FIG. 1, for example, where passages 156 may be divided (e.g., twin passages) within the cylinder head 154 to direct exhaust from respective cylinders (e.g., complementary group #1 and #4 and complementary group #2 and #3) to the assembly (e.g., to respective scrolls of a twin scroll housing).

As to stagnation points, which may be points of maximum pressure (e.g., force) upon the plug 1356 of the wastegate arm and plug 1350, these may be located relatively centrally during opening of the wastegate. In such an example, forces exerted upon the plug 1356 may be more effectively transferred to the arm 1354 and the shaft 1352, which, in turn, may act to diminish vibration, misalignment, etc.

As an example, the shape of the plug 1356 (e.g., via the two plug portions 1357 and 1359) may help reduce impact on an actuator as the actuator rotates the plug 1356 with respect to a wastegate opening that provide for flow of exhaust.

Various views of FIGS. 12 and 13 are shown as "see-through" cutaway views where solid walls may be shown as being hollow, for example, to more clearly illustrate contours of such walls, shapes of passages, etc.

Figure 14:
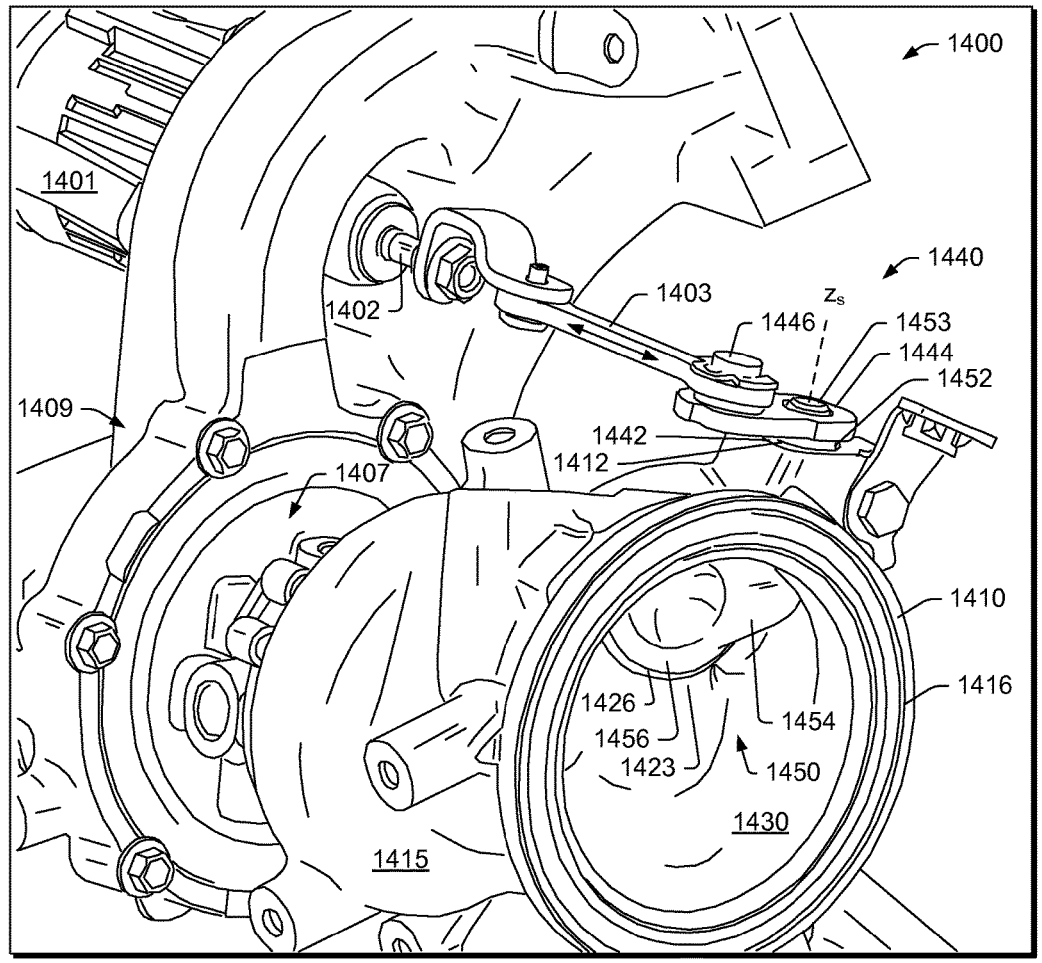
FIG. 14 is an example of an assembly that includes a wastegate.

FIG. 14 shows an example of an assembly 1400 that includes an actuator 1401, an actuation rod 1402, an actuator linkage 1403, a center housing 1407 (e.g., to house a bearing, bearings, etc. for a turbocharger shaft, etc.), a compressor housing 1409, a turbine housing 1410 that includes a bore 1412, a spiral wall 1415 (e.g., that defines, in part, a volute), an exhaust outlet opening 1416, a wastegate wall 1423 that extends to a wastegate seat 1426, and an exhaust chamber 1430.

In the example of FIG. 14, the turbine housing 1410 may be a single piece or multi-piece housing. As an example, the turbine housing 1410 may be a cast component (e.g., formed via sand casting or other casting process). As shown, the turbine housing 1410 includes various walls, which can define features such as the bore 1412, a turbine wheel opening, an exhaust outlet opening, the chamber 1430, etc. In particular, the wastegate wall 1423 defines a wastegate passage in fluid communication with an inlet conduit where a wastegate control linkage 1440 and a wastegate shaft, arm and plug unit 1450 are configured for opening and closing the wastegate passage (e.g., for wastegating exhaust).

In the example of FIG. 14, the wastegate control linkage 1440 includes a bushing 1442 configured for receipt by the bore 1412 of the turbine housing 1410, a control arm 1444 and a peg 1446 and the wastegate shaft, arm and plug unit 1450 includes a shaft 1452, a shaft end 1453, an arm 1454 and a plug 1456 (see, e.g., the units 402, 502, 602, etc.). As shown, the bushing 1442 is disposed between the bore 1412 and the shaft 1452, for example, to support rotation of the shaft 1452, to seal the chamber 1430 from an exterior space, etc. The bore 1412, the bushing 1442 and the shaft 1452 may each be defined by a diameter or diameters as well as one or more lengths.

As an example, the assembly 1400 may be fitted to an exhaust conduit or other component of an internal combustion engine (see, e.g., examples of FIG. 1) via a flange such that exhaust is received via an inlet conduit that may direct exhaust to a volute (e.g., or volutes) that may be defined at least in part by the spiral wall 1415. As an example, a volute (e.g., or volutes) may direct exhaust (e.g., via a nozzle or nozzles) to a turbine wheel disposed in the turbine housing 1410 where the exhaust may flow and expand in a turbine wheel space defined in part by the turbine housing 1410. Exhaust may then exit the turbine wheel space by flowing to the chamber 1430 and then out of the turbine housing 1410 via the exhaust outlet opening 1416.

As to wastegating, upon actuation of the control linkage 1440 (e.g., by the actuator linkage 1403 being operatively coupled to the peg 1446), the wastegate shaft, arm and plug unit 1450 may be rotated such that at least a portion of the received exhaust can flow in the wastegate passage defined by the wastegate wall 1423, past the wastegate seat 1426 and into the chamber 1430, rather than through a nozzle to a turbine wheel space. The wastegated portion of the exhaust may then exit the turbine housing 1410 via the exhaust outlet opening 1416 (e.g., and pass to an exhaust system of a vehicle, be recirculated in part, etc.).

As an example, the control linkage 1440 may exert a force that acts to force the plug 1456 in a direction toward the wastegate seat 1426. For example, the actuator 1401 may include a biasing mechanism (e.g., a spring, etc.) that exerts force, which may be controllably overcome, at least in part, for rotating the plug 1456 away from the wastegate seat 1426 (e.g., for wastegating). As an example, the actuator 1401 may be mounted to the assembly 1400. As an example, the actuator 1401 may be a linear actuator, for example, for moving the rod 1402 along an axis. Depending on orientation of a plug, a shaft, a control linkage and such a rod, to maintain the plug in a closed position, the rod may exert a downward force (e.g., away from the control linkage as in the example of FIG. 14) or the rod may exert an upward force (e.g., toward the control linkage). For example, where the control arm 1444 (e.g., and the peg 1446) of the control linkage 1440 are oriented on the same "side" as the plug 1456 with respect to the shaft 1452, a downward force applied to the control arm 1444 (e.g., via the peg 1446) may act to maintain the plug 1456 in a closed position with respect to the wastegate seat 1426; whereas, where, for example, an approximately 180 degree span exists between a plug and a control arm, an upward force applied to the control arm may act to maintain the plug in a closed position with respect to a wastegate seat.

As an example, the rod 1402 of the actuator 1401 may be biased to exert a force on the control linkage 1440 that causes the control linkage 1440 to exert a force on the plug 1456 such that the plug 1456 seats against the wastegate seat 1426. In such an example, the actuator 1401 may at least in part overcome the force that biases the rod 1402 such that the shaft 1452 rotates the plug 1456 away from the wastegate seat. For example, in FIG. 14, to initiate wastegating, the entire plug 1456 rotates about an axis of the shaft 1452 and moves away from the wastegate seat 1426 (e.g., without any portion of the plug 1456 moving into a wastegate opening defined by the wastegate seat 1426). As an example, the moving away of the plug 1456 may be facilitated by exhaust pressure. For example, in a closed position, the plug 1456 experiences a pressure differential where pressure is higher below the plug 1456 and less above the plug 1456. In such an example, the pressure below the plug 1456 acts in a direction that is countered by the closing force applied to the plug 1456 via the control linkage 1440 (e.g., the pressure differential acts to bias the plug 1456 toward an open position). Accordingly, the closing force applied to the plug 1456 should overcome pressure force from below the plug 1456. Further, where the shaft 1452 may include some play (e.g., axial play, etc.), the closing force applied to the plug 1456 may cause the plug 1456 to move with respect to the wastegate seat 1426.

As an example, a method can include applying a force to a control arm operatively coupled to a shaft; transmitting at least a portion of the force from the shaft, via an arm, to a plug positioned with respect to a wastegate seat of a turbine housing; maintaining an isostatic condition for relative positions of the shaft, the arm and the plug where contact exists between the plug and the wastegate seat; and, in the isostatic condition, fixing the relative positions of the shaft, the arm and the plug via welding. As an example, such a method can include welding the plug to the arm. As an example, a single weld performed during an isotatic condition may act to fix relative positions of two or more components. As an example, multiple welds performed during an isostatic condition may act to fix relative positions of two or more components.

As an example, a method can include welding an arm that includes an opening to a plug that includes a peg where the peg is disposed at least in part in the opening. In such an example, a weld may fix the position of the peg with respect to the opening. As an example, the weld may be formed while an isostatic condition exists and while the plug is in contact with a wastegate seat.

As an example, a method can include welding an arm to a shaft prior to applying a force to a control arm. As an example, an arm may be welded to a shaft and then the shaft may be inserted into a bore of a turbine housing that includes a wastegate seat. In such an example, a plug may be positioned with respect to the wastegate seat and force applied to the plug to seat it with respect to the wastegate seat. In such an example, the force may be applied to the plug indirectly by a control arm that is coupled to the shaft such that the shaft transfers force to the arm, which, in turn, applies force directly to the plug. Where the plug includes a seating surface such as a toroidial surface (e.g., a portion of a torus) and where the wastegate seat includes a conical shape, the force may act to center the plug with respect to the wastegate seat. For example, the plug may include a plug axis defined by a shape of the plug and the wastegate seat may include a wastegate seat axis defined by a shape of the wastegate seat. In such an example, force may cause the plug to self-center in a manner that acts to align the plug axis with the wastegate seat axis (e.g., which may be fixed). Such alignment may enhance sealing, for example, as may be desired for a closed orientation of the plug with respect to the wastegate seat.

As an example, a method can include self-centering a plug with respect to a wastegate seat responsive to applying force.

As an example, relative positions of components, as associated with an isostatic condition, may correspond to a closed orientation of a plug with respect to a wastegate seat.

As an example, a method can include forming an arm via a casting process. As an example, a method can include forming a plug via a casting process. As an example, a method can include forming an arm and a plug as a subunit via a casting process. As an example, a method can include forming a shaft and an arm via a casting process.

As an example, a turbine housing may include a twin scroll housing where two corresponding exhaust passages extend to a wastegate seat.

As an example, a plug can include a shell portion. As an example, a plug can include a substantially hemispherical portion.

As an example, a method can include welding an arm to a shaft; inserting the shaft into a bore of a bushing in a bore of a turbine housing that includes a wastegate seat; contacting the arm and a plug and contacting the plug and the wastegate seat; and welding the plug to the arm. As an example, such a method may include welding a control arm to the shaft. As an example, a method may include applying a force to a control arm where at least a portion of the force is transferred from a shaft to an arm and from the arm to a plug prior to welding of the plug to the arm. As an example, a method can include self-centering a plug with respect to a wastegate seat responsive to applying force.

As an example, a method can include assembling a turbocharger that includes a turbine housing, a control arm, a shaft, an arm and a plug. As an example, a method can include welding an arm to a shaft; inserting the shaft into a bore of a bushing in a bore of a turbine housing that includes a wastegate seat; contacting the arm and a plug and contacting the plug and the wastegate seat; welding the plug to the arm; and assembling a turbocharger that includes the turbine housing, the control arm, the shaft, the arm and the plug.

As an example, a turbine housing assembly can include a wastegate seat; a bore; a bushing disposed at least partially in the bore; a shaft disposed at least partially in the bushing; a cast arm welded to the shaft; a cast plug welded to the arm; a control arm welded to the shaft; and an actuator linked to the control arm to orient the cast plug in a closed orientation with respect to the wastegate seat and to orient the cast plug in an open orientation with respect to the wastegate seat. In such an example, the arm can include an opening, where the cast plug includes a peg disposed at least in part in the opening and where a weld fixes the position of the peg with respect to the opening (e.g., weld that couples the arm and the plug).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A method comprising:
    applying a force to a unit that comprises a shaft and an arm wherein a portion of the shaft is disposed in a bore of a bushing in a bore of a turbine housing, wherein the shaft comprises a shaft axis and a shaft diameter and wherein the bore of the bushing comprises a bushing bore axis and a bushing bore diameter that exceeds the shaft diameter;
    transmitting at least a portion of the force via the arm to a plug positioned with respect to a wastegate seat of the turbine housing;
    maintaining an isostatic condition for relative positions of the unit and the plug wherein contact exists between the plug and the wastegate seat and wherein the shaft is tilted in the bore of the bushing by a tilt angle of the shaft axis with respect to the bushing bore axis; and
    in the isostatic condition, fixing the relative positions of the unit and the plug via welding.

2. The method of claim 1 wherein the welding comprises welding the plug to the arm.

3. The method of claim 1 wherein the arm comprises an opening and wherein the plug comprises a peg disposed at least in part in the opening.

4. The method of claim 1 wherein the relative positions correspond to a closed orientation of the plug with respect to the wastegate seat.

5. The method of claim 1 comprising forming the plug via a casting process.

6. The method of claim 1 comprising forming the shaft and the arm via a casting process.

7. The method of claim 1 wherein the turbine housing comprises a twin scroll housing where two corresponding exhaust passages extend to the wastegate seat.

8. The method of claim 1 wherein the plug comprises a shell portion.

9. The method of claim 1 wherein the plug comprises a substantially hemispherical portion.

10. The method of claim 1 comprising self-centering the plug with respect to the wastegate seat responsive to applying the force.

11. The method of claim 1 wherein the plug comprises a plug axis, wherein the arm comprises an arm axis and wherein fixing the relative positions of the unit and the plug via welding comprises fixing positions of the plug axis and the arm axis with a tilt of the plug axis with respect to the arm axis.

12. A method comprising:
welding an arm to a shaft;
inserting the shaft into a bore of a bushing in a bore of a turbine housing that comprises a wastegate seat wherein the shaft comprises a shaft axis and a shaft diameter and wherein the bore of the bushing comprises a bushing bore axis and a bushing bore diameter that exceeds the shaft diameter;
contacting the arm and a plug and contacting the plug and the wastegate seat wherein the contacting the plug and the wastegate seat comprises applying a force to the plug to achieve a closed orientation of the plug with respect to the wastegate seat wherein the shaft is tilted in the bore of the bushing by a tilt angle of the shaft axis with respect to the bushing bore axis; and
welding the plug to the arm.

13. The method of claim 12 comprising welding a control arm to the shaft.

14. The method of claim 13 wherein the applying a force comprises applying a force to the control arm wherein at least a portion of the force is transferred from the shaft to the arm and from the arm to the plug prior to the welding of the plug to the arm.

15. The method of claim 14 comprising self-centering the plug with respect to the wastegate seat responsive to applying the force.

16. The method of claim 12 comprising assembling a turbocharger that comprises the turbine housing, a control arm, the shaft, the arm and the plug.

17. The method of claim 12 wherein the plug comprises a plug axis, wherein the arm comprises an arm axis and wherein welding the plug to the arm comprises fixing positions of the plug axis and the arm axis with a tilt of the plug axis with respect to the arm axis.

18. A turbine housing assembly comprising:
a wastegate seat;
a bore;
a bushing disposed at least partially in the bore;
a shaft disposed at least partially in a bore of the bushing wherein the shaft comprises a shaft axis and a shaft diameter and wherein the bore of the bushing comprises a bushing bore axis and a bushing bore diameter that exceeds the shaft diameter;
a cast arm welded to the shaft;
a cast plug welded to the cast arm wherein the cast arm comprises an opening and an arm axis defined by the opening, wherein the cast plug comprises a peg and a plug axis defined by the peg and wherein a weld fixes the peg of the plug in the opening of the arm with a tilt between the plug axis and the arm axis;
a control arm welded to the shaft; and
an actuator linked to the control arm to orient the cast plug in a closed orientation with respect to the wastegate seat and to orient the cast plug in an open orientation with respect to the wastegate seat, wherein, in the closed orientation, the shaft is tilted in the bore of the bushing by a tilt angle of the shaft axis with respect to the bushing bore axis.

19. A turbine housing assembly comprising:
a wastegate seat;
a bore;
a bushing disposed at least partially in the bore;
a unit that comprises a shaft and an arm wherein the shaft is disposed at least partially in a bore of the bushing wherein the shaft comprises a shaft axis and a shaft diameter and wherein the bore of the bushing comprises a bushing bore axis and a bushing bore diameter that exceeds the shaft diameter;
a plug welded to the arm, wherein the plug comprises a peg and a plug axis defined by the peg, wherein the arm comprises an opening and an arm axis defined by the opening, wherein a weld fixes the peg of the plug in the opening of the arm with a tilt between the plug axis and the arm axis;
a control arm operatively coupled to the shaft; and
an actuator linked to the control arm to orient the plug in a closed orientation with respect to the wastegate seat and to orient the plug in an open orientation with respect to the wastegate seat, wherein, in the closed orientation, the shaft is tilted in the bore of the bushing by a tilt angle of the shaft axis with respect to the bushing bore axis.

* * * * *